United States Patent
Tay

(10) Patent No.: US 9,251,571 B2
(45) Date of Patent: Feb. 2, 2016

(54) AUTO-FOCUS IMAGE SYSTEM

(71) Applicant: Hiok Nam Tay, Singapore (SG)

(72) Inventor: Hiok Nam Tay, Singapore (SG)

( * ) Notice: Subject to any disclaimer, the term of this patent is extended or adjusted under 35 U.S.C. 154(b) by 0 days.

(21) Appl. No.: 14/635,046

(22) Filed: Mar. 2, 2015

(65) Prior Publication Data

US 2015/0317774 A1 Nov. 5, 2015

Related U.S. Application Data

(63) Continuation of application No. 13/492,825, filed on Jun. 9, 2012, now abandoned, which is a continuation-in-part of application No. PCT/IB2011/052515, filed on Jun. 9, 2011.

(51) Int. Cl.
| | |
|---|---|
| G06K 9/40 | (2006.01) |
| G06T 5/00 | (2006.01) |
| G02B 7/36 | (2006.01) |
| G06K 9/46 | (2006.01) |
| G06T 7/00 | (2006.01) |
| H04N 5/232 | (2006.01) |

(52) U.S. Cl.
CPC . *G06T 5/003* (2013.01); *G02B 7/36* (2013.01); *G06K 9/4604* (2013.01); *G06T 7/0085* (2013.01); *H04N 5/23212* (2013.01)

(58) Field of Classification Search
None
See application file for complete search history.

(56) References Cited

U.S. PATENT DOCUMENTS

| | | |
|---|---|---|
| 4,652,931 A | 3/1987 | Okudaira et al. |
| 4,670,645 A * | 6/1987 | Ohtaka ............ G02B 27/40 |
| | | 250/201.8 |
| 4,694,151 A | 9/1987 | Yoshimura |
| 5,040,228 A | 8/1991 | Bose |
| 5,396,336 A | 3/1995 | Yoshii et al. |
| 5,496,106 A | 3/1996 | Anderson |
| 5,729,290 A | 3/1998 | Tokumitsu et al. |
| 5,790,710 A | 8/1998 | Price et al. |
| 5,875,040 A | 2/1999 | Matraszek |
| 5,880,455 A | 3/1999 | Otaki et al. |

(Continued)

FOREIGN PATENT DOCUMENTS

| | | |
|---|---|---|
| EP | 0552016 A2 | 7/1993 |
| EP | 0926526 A2 | 6/1999 |

(Continued)

OTHER PUBLICATIONS

A Comparison of different focus—algorithms, Groen et al., Cytometry 6, 1985, pp. 81-91.*

(Continued)

*Primary Examiner* — Jayesh A Patel

(57) ABSTRACT

An auto-focus image system includes a focus signal generator and a pixel array coupled thereto that captures an image that includes a plurality of edges. The generator computes a focus signal from a plurality of edge-sharpness measures, each measured from and contributed by a different edge as a quantity with a unit that is a power of a unit of length, such as a distance in the edge, an area, or an even-order central moment. A relative weight of the contribution by an edge is reduced depending on at least a pair of shape measures, each being computed from a plurality of sample-pair differences of the edge. One may be the edge-sharpness measure. The weight may be zero if the pair of shape measures falls outside a predetermined region. At least one symmetrical sequence of gradients exists such that an edge with it has reduced relative weight.

20 Claims, 19 Drawing Sheets

(56) References Cited

U.S. PATENT DOCUMENTS

| | | | |
|---|---|---|---|
| 6,094,508 A | 7/2000 | Acharya | |
| 6,337,925 B1 | 1/2002 | Cohen | |
| 6,415,053 B1* | 7/2002 | Norimatsu | G06T 5/20 348/625 |
| 7,406,208 B2 | 7/2008 | Chiang | |
| 7,586,520 B2 | 9/2009 | Igarashi | |
| 7,590,288 B1 | 9/2009 | Alvarez | |
| 7,668,389 B2 | 2/2010 | Kitamura | |
| 7,720,302 B2 | 5/2010 | Aoyama | |
| 7,899,264 B2 | 3/2011 | Stewart | |
| 7,978,247 B2 | 7/2011 | Nakajima | |
| 8,159,600 B2 | 4/2012 | Tay | |
| 8,264,591 B2 | 9/2012 | Yeo | |
| 8,457,431 B2 | 6/2013 | Tay | |
| 8,462,258 B2 | 6/2013 | Tay | |
| 8,630,504 B2 | 1/2014 | Tay | |
| 8,724,009 B2 | 5/2014 | Tay | |
| 2002/0114015 A1 | 8/2002 | Fujii | |
| 2002/0191973 A1 | 12/2002 | Hofer et al. | |
| 2003/0053161 A1* | 3/2003 | Li | G06T 5/20 358/532 |
| 2003/0099044 A1* | 5/2003 | Fujii | G02B 7/36 359/698 |
| 2003/0113032 A1 | 6/2003 | Wang | |
| 2003/0158710 A1 | 8/2003 | Bowley, Jr. | |
| 2003/0219172 A1 | 11/2003 | Caviedes | |
| 2004/0071363 A1* | 4/2004 | Kouri | G06K 9/00516 382/276 |
| 2004/0267506 A1 | 12/2004 | Bowley, Jr. | |
| 2005/0094900 A1* | 5/2005 | Abe | G06T 7/0083 382/300 |
| 2005/0189419 A1 | 9/2005 | Igarashi | |
| 2005/0231603 A1 | 10/2005 | Poon | |
| 2005/0243351 A1 | 11/2005 | Aoyama | |
| 2005/0244077 A1 | 11/2005 | Kitamura | |
| 2005/0248655 A1 | 11/2005 | Kitamura | |
| 2005/0249429 A1 | 11/2005 | Kitamura | |
| 2006/0029284 A1* | 2/2006 | Stewart | G02B 7/365 382/255 |
| 2006/0056835 A1 | 3/2006 | Poon et al. | |
| 2006/0062484 A1 | 3/2006 | Aas | |
| 2006/0078217 A1* | 4/2006 | Poon | H04N 5/23212 382/255 |
| 2006/0078218 A1 | 4/2006 | Igarashi | |
| 2006/0188170 A1 | 8/2006 | Kanda | |
| 2006/0204120 A1 | 9/2006 | Poon | |
| 2006/0249429 A1 | 11/2006 | Iki | |
| 2006/0290932 A1 | 12/2006 | Kawanami | |
| 2007/0058879 A1* | 3/2007 | Cutler | G06T 5/006 382/254 |
| 2007/0206937 A1 | 9/2007 | Kusaka | |
| 2007/0279696 A1 | 12/2007 | Matsuzaka | |
| 2008/0021665 A1 | 1/2008 | Vaughn | |
| 2008/0036900 A1 | 2/2008 | Nakajima | |
| 2008/0151309 A1 | 6/2008 | Mizobe | |
| 2008/0219655 A1 | 9/2008 | Yoon et al. | |
| 2008/0309777 A1 | 12/2008 | Aoyama | |
| 2009/0060329 A1 | 3/2009 | Nakajima | |
| 2009/0102963 A1* | 4/2009 | Yeo | G02B 7/36 348/349 |
| 2009/0160962 A1 | 6/2009 | Tabuchi et al. | |
| 2009/0256927 A1 | 10/2009 | Komiya et al. | |
| 2009/0278947 A1 | 11/2009 | Schultz | |
| 2010/0033617 A1 | 2/2010 | Forutanpour | |
| 2010/0128144 A1* | 5/2010 | Tay | H04N 5/23212 348/229.1 |
| 2011/0134312 A1 | 6/2011 | Tay | |
| 2012/0314121 A1 | 12/2012 | Tay | |
| 2013/0265480 A1 | 10/2013 | Tay | |

FOREIGN PATENT DOCUMENTS

| | | |
|---|---|---|
| EP | 1 407 940 A2 | 4/2004 |
| GB | 2 475 983 A | 6/2011 |
| GB | 2475983 A | 6/2011 |
| JP | 61-210310 A | 9/1986 |
| JP | 03-154576 A | 7/1991 |
| JP | 06-006661 A | 1/1994 |
| JP | 07-177414 A | 7/1995 |
| JP | 07-311025 A | 11/1995 |
| JP | 1996-68721 A | 3/1996 |
| JP | 1998-099279 A | 4/1998 |
| JP | 2001-331806 A | 11/2001 |
| JP | 2002-189164 A | 7/2002 |
| JP | 2002-209135 A | 7/2002 |
| JP | 2002-214513 A | 7/2002 |
| JP | 2002-214523 A | 7/2002 |
| JP | 2002-214524 A | 7/2002 |
| JP | 2003-125198 A | 4/2003 |
| JP | 2003-167182 A | 6/2003 |
| JP | 2003-262783 A | 9/2003 |
| JP | 2003-262909 A | 9/2003 |
| JP | 2004-028761 A | 1/2004 |
| JP | 2004-110059 A | 4/2004 |
| JP | 2004-198715 A | 7/2004 |
| JP | 2004-219546 A | 8/2004 |
| JP | 2005-043792 A | 2/2005 |
| JP | 2006-171840 A | 6/2006 |
| JP | 2007-322259 A | 12/2007 |
| JP | 2008-118555 A | 5/2008 |
| JP | 2009-218806 A | 9/2009 |
| JP | 2010-237018 A | 10/2010 |
| JP | 2011-003124 A | 1/2011 |
| WO | 2009-063326 A | 5/2009 |
| WO | 2010/036249 A1 | 4/2010 |
| WO | 2010/061250 A1 | 6/2010 |
| WO | WO 2010/061250 A1 | 6/2010 |

OTHER PUBLICATIONS

PCT/IB2010/055649 International Search Report, mailed on May 5, 2011 by the European Patent Office, Rijswijk.
PCT/IB2010/055649 Written Opinion of the International Search Authority, mailed on May 5, 2011 by the European Patent Office, Rijswijk.
Groen et al., A comparison of different focus functions for use in autofocus algorithms, Cytometry 6, 1985, pp. 81-91.
PCT/IB2011/52515 International Search Report, mailed on Nov. 4, 2011 by the European Patent Office, Rijswijk.
PCT/IB2011/52515 Written Opinion of the International Search Authority, mailed on Nov. 4, 2011 by the European Patent Office, Rijswijk.
Japan Patent Application No. 2012-542670, First Office Action (Rejection), mailed on Oct. 7, 2014, by Japan Patent Office.
PCT/IB2010/055641 Invitation to Pay Additional Fees.
Law, T. et al: "Image Filtering, Edge Detection, and Edge Tracing Using Fuzzy Reasoning", IEEE Transactions on Pattern Analysis and Machine Intelligence, IEEE Service Center, Los Alamitos, CA, US, vol. 18, No. 5, May 1, 1996, pp. 481-491, XP000592440, ISSN: 0162-8828, DOI: 10.1109/34.494638 p. 482, right-hand column.
PCT/IB2010/055641 International Search Report.
PCT/IB2010/055641 Written Opinion of the International Search Authority.
Colchester A C F et al. "A hierarchical rule-based method for image segmentation using maximum gradient profiles", Proceedings of the Alvey Vision Conference, vol. 4th, Jan. 1, 1988, pp. 211-220, XP009147417, p. 211, left-hand column.
Ingmar Jahr: "Lexikon der Industriellen Verarbeiting", Jul. 19, 2007, pp. 1-88, XP55010414, Retrieved from the Internet: URL: http://www.hochschule-bochum.de/fileadmin/media/fb_m/Institute/Automatisierung/LeixikonIndustrBildverarb.pdf, [retrieved by EPO as the ISR for PCT/IB2011/052529 on Oct. 25, 2011], pp. 32 [Fokusierung, Fokustest] and 46 [Kantenform].
Ingmar Jahr: "Labor für Informatik (LFI)", Oct. 25, 2011, XP55010416, Retrieved from the Internet: URL:http://www.hochschule-bochum.de/fbm/einrichtungen/institute/automatisierung/downloads/labor-fuer-informatik-lfi.html [retrieved on Oct. 25, 2011 by EPO as the ISR for PCT/IB2011/052529].
PCT/IB2011/052529, International Search Report by the ISA.

(56) References Cited

OTHER PUBLICATIONS

PCT/IB2011/052529, Written Opinion of the ISA.
Bernd Jahne, "Practical Handbook on Imaging Processing for Scientific and Technical Applications," 2nd edition, Mar. 15, 2004, pp. 392-394, CRC Press.
UK Patent Application No. GB1020759.5 Search Report under Section 17.
Pan, Lin et al., Application of Edge Confidence Detection in the Autofocus under Fundus Camera, 2010 Second WRI Global Congress on Intelligent Systems (GCIS), vol. 2, DOI: 10.1109/GCIS. 2010.17, 2010, pp. 399-402, IEEE Conference Publications.
Nguyen, Thuy Tuong et al., Camera auto-exposing and auto-focusing for edge-related applications using a particle filter, 2010 IEEE/RSJ International Conference on Intelligent Robots and Systems (IROS), DOI: 10.1109/IROS.2010.6661024, 2010, pp. 1177-1182, IEEE Conference Publications.
Shoa, T. et al., Optimization algorithm for restoring an all-focused micromechanical structure image, 2004 Canadian Conference on Electrical and Computer Engineering, vol. 3, DOI: 10.1109/CCECE. 2004.1349742, 2004, pp. 1707-1710, vol. 3, IEEE Conference Publications.
Shah, P. et al., An efficient adaptive fusion scheme for multifocus images in wavelet domain using statistical properties of neighborhood, 2011 Proceedings of the 14th International Conference on Information Fusion (FUSION), 2011, pp. 1-7, IEEE Conference Publications.
Andrew, John R., "Variable focusing due to refractive-index gradients in a diode-array traveling-wave amplifier", Journal of Applied Physics, 1988, pp. 2134-2137, vol. 64, issue 4, AIP Journals & Magazines, USA.
Chung, M. et al., "Initial density profile measurements using a Laser-Induced Fluorescence diagnostic in the Paul Trap Simulator Experiment", Particle Accelerator Conference, 2007, pp. 3666-3668, IEEE Conference Publications, USA.
Oishi, T. et al., "Beam emission spectroscopy measurement for density fluctuations in compact helical system", Review of Scientific Instruments, 2004, pp. 4118-4120, vol. 75, issue 10, AIP Journals & Magazines, USA.
Hansen, J.L. et al., "Conformer separation of 3-aminophenol using an electrostatic deflector", Lasers and Electro-optics 2009 and the European Quantum Electronics Conference CLEO Europe—EQEC 2009, European Conference on, p. 1.
Urruchi, V. et al., "Electrical modeling and characterization of voltage gradient in liquid crystal microlenses", Review of Scientific Instruments, 2013, vol. 84, issue 11, pp. 116105-116105-3, AIP Journals & Magazines, USA.
Reedy, R.C. et al., "Low-cost modification for the high-frequency raster on the camera IMS-3F secondary ion mass spectrometer", Journal of Vacuum Science and Technology A, vol. 17, issue 1, 1999, pp. 317-318, AVS Journals & Magazines, USA.
Yan, Qing et al., "No-reference image blur assessment based on gradient profile sharpness", Broadband Multimedia Systems & Broadcasting, 2013 Symposium on, 2013, pp. 1-4, IEEE Conference Publications, USA.
Liu, Lian-Jie et al., "A fast auto-focusing technique for multi-objective situation", Computer Application and System Modelling (ICCASM), 2010 International Conference on, vol. 1, 2010, pp. V1-607-V1-610, IEEE Conference Publications, USA.
Yan, Qing et al., "Separation of weak reflection from a single superimposed image using gradient profile sharpness", Circuits and Systems (ISCAS), 2013 IEEE International Symposium on, 2013, pp. 937-940, IEEE Conference Publications, USA.
Liu, Ruian et al., "Adaptive regulation of CCD camera in eye gaze tracking system", Image and Signal Processing, 2009 CISP '09, 2nd International Conference on, 2009, pp. 1-4, IEEE Conference Publications, USA.
Liu, Hong et al., "Depth reovery from defocus images using total variation", Computer Modelling and Simulation, 2010, ICCMS '10, Second International Conference on, vol. 2, 2010, pp. 146-150, IEEE Conference Publications, USA.
Harasse, S., et al., "Content and illumination invariant blur measures for realtime video processing", Computer and Information Technology, 2007 CIT 200 7th IEEE International Conference on, 2007, pp. 551-556, IEEE Conference Publications, USA.
Liu, Ruian, et al., "Real time auto-focus algorithm for eye gaze tracking system", Intelligent Signal Processing and Communication Systems, 2007 ISPACS 2007, International Symposium on, 2007, pp. 742-745, IEEE Conference Publications, USA.
Choi, Kang-Sun et al., "New autofocusing technique using the frequency selective weighted median filter for video cameras", Consumer Electronics, 1999, ICCE International Conference on, 1999, pp. 160-161, IEEE Conference Publications, USA.
PCT/IB2011/052524 Internal Search Report, mailed on Jan. 20, 2012 by the European Patent Office, Rijswijk.
PCT/IB2011/052524 Written Opinion of the Internal Search Authority, mailed on Jan. 20, 2012 by the European Patent Office, Rijswijk.

\* cited by examiner

|    | C1      | C2       | C3       | C4       | C5       | C6       |
|----|---------|----------|----------|----------|----------|----------|
| R1 | 10 9 V  | 10 10 V  | 10 9 V   | 2 0      | 0 0      | 0 0      |
| R2 | 3 0     | 10 8 V   | 10 11 V  | 9 10 V   | 1 0      | 0 0      |
| R3 | 1 0     | 3 1      | 8 8 V    | 9 11 V   | 7 8 V    | 1 0      |
| R4 | 0 0     | 1 0      | 3 2      | 7 8 V    | 8 10 V   | 7 8 V    |
| R5 | 0 -2    | 0 0      | 1 1      | 3 3      | 7 12 H   | 6 12 H   |
| R6 | 0 -1    | 0 -1     | 0 0      | 1 2      | 3 0 V    | 1 8 H    |

$b = a\cos\phi$ corrects edge width for slant angle $\phi$
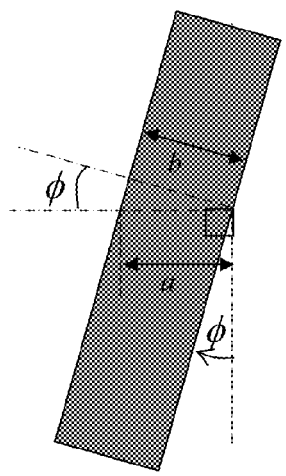 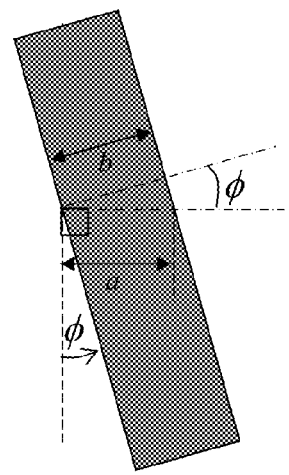
FIG. 6A  FIG. 6B
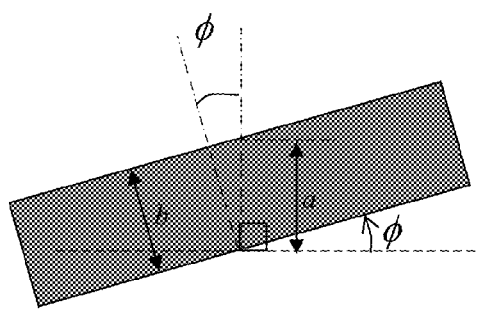 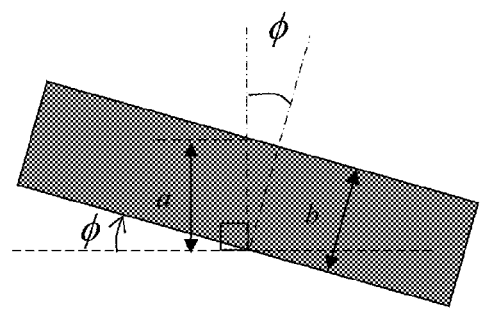
FIG. 6C  FIG. 6D

| | C1 | | C2 | | C3 | | C4 | | C5 | | C6 | |
|---|---|---|---|---|---|---|---|---|---|---|---|---|
| R1 | 0 | 6 H | 5 | 10 H | 1 | 3 | 2 | 0 | 0 | 0 | 0 | 0 |
| R2 | 3 | 0 | 8 | 8 H | 15 | 11 V | 19 | 10 V | 1 | 0 | 0 | 0 |
| R3 | 1 | 0 | 3 | 1 | 18 | 8 V | 19 | 11 V | 17 | 8 V | 1 | 0 |
| R4 | 0 | 0 | 1 | 0 | 3 | 2 | 17 | 8 V | 18 | 10 V | 7 | 3 H |
| R5 | 0 | 2 | 0 | 0 | 1 | 1 V | 3 | 3 | 7 | 12 H | 6 | 12 H |
| R6 | 0 | 1 | 0 | 1 | 0 | 0 | 1 | 2 | 3 | 0 | 1 | 8 H |

AUTO-FOCUS IMAGE SYSTEM

CROSS-REFERENCE TO RELATED APPLICATIONS

This application is a continuation of U.S. patent application Ser. No. 13/492,825 filed on Jun. 9, 2012, which is a continuation-in-part of International Patent Application No. PCT/IB2011/052515 filed on Jun. 9, 2011.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a position of a focus lens ("focus position"). There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto-focus image system includes a pixel array and a focus signal generator coupled to the pixel array. The pixel array captures an image that includes a plurality of edges. The generator generates a focus signal that is computed from a plurality of edge-sharpness measures, each being measured from and contributed by a different one of the plurality of edges. The edge-sharpness measure has a unit that is a power of a unit of length. The edge-sharpness measure of an edge may be a distance in the edge. Or, it may be an area under a gradient profile of the edge. Or, it may be a central moment of gradients or second derivatives of the edge. The generator may reduce a relative extent to which an edge contributes to the focus signal using two or more shape measures of the edge. Each shape measure is computed from a plurality of sample-pair differences, where each sample-pair difference is a difference between a pair of samples of image data within a predetermined neighborhood of the edge. One of the shape measures may be the edge-sharpness measure itself. An edge may be prevented from contributing to the focus signal, i.e. given a weight of zero, if an n-tuple of the two or more shape measures lies outside a predetermined region, where n is the number of the two or more shape measures. There is at least one perfectly symmetrical sequence of gradients that if the edge has the sequence across itself then the edge is either rejected or has its relative extent reduced.

Summarized below are enumerated aspects of the invention.

1. A method for generating a focus signal from a plurality of edges of an image of a scene to indicate a degree of image sharpness, comprising:

evaluating in a computing device a first measure and a second measure on an edge detected from the image to find a first value and a second value, respectively; and, determining by use of at least the first and second values to reduce a relative extent that the edge weighs in contributing to the focus signal as compared with other edges that contribute to the focus signal, wherein the first and second measures of any edge are each a quantity that depends on at least two image-sample differences, each image-sample difference being a difference between a pair of samples of image data, the samples being from a sequence of image data samples across said any edge.

2. The method of the above aspect, wherein the evaluating the first measure does not depend upon detection of another edge.

3. The method of any one of the above aspects, wherein a 20% decrease in an illumination of the scene does not result in a difference whether the edge is omitted or allowed to contribute to the focus signal.

4. The method of any one of the above aspects, wherein the determining determines whether the first value meets a predetermined criterion that depends on at least the second value in order to determine the relative extent.

5. The method of Aspect 4, further comprising: omitting or deemphasizing the edge in the generating the focus signal where the edge does not meet the predetermined criterion.

6. The method of any one of the above aspects, wherein the determining determines the relative extent as a function of at least the first and second measures.

7. The method of Aspect 6, wherein the relative extent is a weight for the edge in contributing to the generating the focus signal.

8. The method of any one of the above aspects, wherein any edge that contributes to the focus signal contributes an edge-sharpness measure that is a quantity that is computed from a plurality of samples of image data within a predetermined neighborhood of said any edge.

9. The method of Aspect 8, wherein the edge-sharpness measure is also the second measure.

10. The method of Aspect 8, wherein the edge-sharpness measure is neither the first measure nor the second measure.

11. The method of Aspect 10, wherein the edge-sharpness measure is not evaluated where the edge is omitted from the generating of the focus signal.

12. The method of Aspect 10, wherein the edge-sharpness measure is a width of a predefined portion of the edge predefined according to a predetermined manner.

13. The method of Aspect 10, wherein the edge-sharpness measure is a peak gradient value of the edge divided by a contrast across the edge or across a predefined portion of the edge.

14. The method of Aspect 10, wherein the edge-sharpness measure is a second moment of gradients in the sequence of gradients.

15. The method of any one of the above aspects, wherein each edge consists of a plurality of pixels arrayed contiguously in a first direction and is detected by an edge detector.

16. The method of Aspect 15, wherein the edge detector detects said each edge using a first-order edge detection operator.

17. The method of any one of the above aspects, wherein the first and second measures are mutually independent in the sense that neither can be computed from the other without further involving at least one sample of image data from a predetermined neighborhood of the edge for which the first and second measures are computed.

18. The method of any one of the above aspects, wherein the first and second measures and the edge-sharpness measure of any edge are computed from a plurality of samples of image data within a predetermined neighborhood of said any edge.

19. The method of any one of the above aspects, wherein the edge-sharpness measure of any edge has a unit of a power of a unit of length, given that distance between gradients and count of pixels both have a unit that is a unit of length, a gradient value has a unit that is a unit of energy divided by a unit length, and normalized gradient values are unitless.

20. The method of any one of the above aspects, wherein the edge-sharpness measure of any edge does not have a unit of energy in its unit, given that each sample of image data has a unit that is a unit of energy, that a difference between any pair of samples of image data divided by a distance between the samples has a unit that is a unit of energy divided by a unit of length, that distance between a pair of gradients and count of pixels both have a unit that is a unit of length, that gradient value has a unit that is a unit of energy divided by a unit length and normalized gradient values are unitless.

21. The method of any one of the above aspects, wherein the sharpness measure of the edge is not evaluated where the edge does not contribute to the generating of the focus signal.

22. The method of any one of the above aspects, wherein the first and second measures are not affected by scaling the plurality of samples of image data by a non-zero scaling factor while other samples of image data are not scaled.

23. The method of any one of the above aspects, wherein the first and second measures are both affected by scaling the plurality of samples of image data by a non-zero scaling factor.

24. The method of any one of the above aspects, wherein the first measure is any one of: a width; a gradient value or a difference between a pair of gradient values; a first derivative of gradient; and an area under the gradients plotted against distance.

25. The method of any one of the above aspects, wherein the first measure is any one of: a gradient value or a difference between a pair of gradient values; a first derivative of gradient; and an area under the gradients plotted against distance, each being normalized by a peak gradient value or interpolated peak gradient value of the edge.

26. The method of any one of the above aspects, wherein the first measure is an interpolated gradient value, normalized by a peak gradient value or interpolated peak gradient value, at a predefined distance from a peak gradient or interpolated peak of a sequence of gradients across the edge.

27. The method of any one of the above aspects, wherein the first measure of any edge is a width of a predefined undivided portion of said any edge, the predefined undivided portion being defined in a predetermined manner with respect to the plurality of samples of image data of said any edge.

28. The method of any one of the above aspects, wherein the second measure of any edge is a width of a predefined undivided portion of said any edge, the predefined undivided portion being defined in a predetermined manner with respect to the plurality of samples of image data of said any edge.

29. The method of any one of the above aspects, wherein the edge-sharpness measure of any edge is a width of a predefined undivided portion of said any edge, the predefined undivided portion being defined in a predetermined manner with respect to the plurality of samples of image data of said any edge.

30. The method of Aspect 27 or 28 or 29, wherein the predefined undivided portion is a narrowest undivided portion of said any edge that contributes a predetermined fraction of a contrast across said any edge.

31. The method of Aspect 27 or 28 or 29, wherein the predefined undivided portion consists of all pixels of said any edge that have gradient values above a predetermined threshold.

32. The method of Aspect 27 or 28 or 29, wherein the predefined undivided portion is a widest undivided portion between a positive peak (or interpolated peak) and a negative peak (or interpolated peak) of a sequence of second order derivatives across said any edge.

33. The method of any one of the above aspects, wherein the second measure of any edge is any one of: a width; a gradient value or a difference between a pair of gradient values; a first derivative of gradient; and an area under the gradients plotted against distance.

34. The method of any one of the above aspects, wherein the second measure of any edge is any one of: a difference between gradient values; and a first derivative of gradient, each being normalized by a peak gradient value or interpolated peak gradient value of said any edge and the second measure is not the edge-sharpness measure of said any edge.

35. The method of any one of the above aspects, wherein the second measure of any edge is an interpolated gradient value, normalized by a gradient value of a peak gradient or an interpolated peak of a sequence of gradients across said any edge, at a predefined distance from the peak gradient or the interpolated peak and the second measure is not the edge-sharpness measure of said any edge.

36. The method of any one of the above aspects, wherein the second measure of any edge measures a distance between a gradient/interpolated gradient and another gradient/interpolated gradient, both being part of a sequence of gradients across said any edge and sharing a gradient value at a given percentage down from a peak gradient or an interpolated peak of the sequence of gradients.

37. The method of any one of the above aspects, wherein the second measure of any edge measures an area of a region under a sequence of gradients of said any edge plotted against distance, further normalized by a peak gradient value or an interpolated peak gradient value of the sequence of gradients.

38. The method of any one of the above aspects, wherein the second measure of any edge is a peak gradient value of a sequence of gradients across said any edge divided by a contrast across said any edge.

39. The method of any one of the above aspects, wherein the second measure of any edge is a function of distances of a plurality of gradients from a sequence of gradients across said any edge from a predefined position relative to the plurality of gradients.

40. The method of Aspect 39, wherein the predefined position is a center of gravity among the plurality of gradients, gradient values being treated as weights.

41. The method of Aspect 40, wherein the function measures a k-th central moment of the plurality of gradients about the predefined position, k being a positive even integer.

42. The method of any one of the above aspects, wherein the second measure of any edge is equal to a sum of a power of a plurality of gradient values from a sequence of gradients across said any edge, normalized by the power of a peak gradient value or a interpolated peak gradient value interpolated for the sequence of gradients, and the second measure is not the edge-sharpness measure of said any edge.

43. The method of Aspect 42, wherein each gradient value among the plurality of gradient values either exceeds or is equal to a predetermined fraction of the peak gradient value or the interpolated peak gradient value.

44. The method of Aspect 43, wherein for each gradient value among the plurality of gradient values, a constant equal to the predetermined fraction is subtracted from the second measure.

45. The method of any one of the above aspects, wherein the edge-sharpness measure of any edge measures a distance between a gradient/interpolated gradient and another gradient/interpolated gradient, both being part of a sequence of gradients across said any edge and sharing a gradient value at a given percentage down from a peak gradient or an interpolated peak of the sequence of gradients.

46. The method of any one of the above aspects, wherein the edge-sharpness measure of any edge measures an area of a region under a sequence of gradients of said any edge plotted against distance, further divided by a peak gradient value or an interpolated peak gradient value of the sequence of gradients.

47. The method of any one of the above aspects, wherein the edge-sharpness measure of any edge is a peak gradient value of a sequence of gradients across said any edge divided by a contrast across said any edge.

48. The method of any one of the above aspects, wherein the edge-sharpness measure of any edge is a function of distances of a plurality of gradients of a sequence of gradients across said any edge from a predefined position relative to the plurality of gradients.

49. The method of Aspect 48, wherein the predefined position is a center of gravity among the plurality of gradients, gradient values being treated as weights.

50. The method of Aspect 48, wherein the function measures a k-th central moment of the plurality of gradients about the predefined position, k being a positive even integer.

51. The method of Aspect 48, wherein each gradient value among the plurality of gradient values either exceeds or is equal to a predetermined fraction of the peak gradient value or the interpolated peak gradient value.

52. The method of Aspect 51, wherein for each gradient value among the plurality of gradient values, a constant equal to the predetermined fraction is subtracted from the second measure.

53. The method of any one of the above aspects, further comprising: storing the edge in a memory depending on the relative extent.

54. The method of any one of the above aspects, further comprising: displaying the edge on a display depending on the relative extent.

55. The method of any one of the above aspects, wherein the computing device comprises a buffer to store at least a portion of the image at a time.

56. The method of any one of the above aspects, wherein the determining is not based on measuring an extent to which a sequence of gradients across said each edge departs from perfect reflection symmetry.

57. The method of any one of the above aspects, wherein there is a spurious sequence of gradients having perfect reflection symmetry such that if the edge has the spurious sequence of gradients across itself then the determining will reduce the relative extent.

58. The method of Aspect 57, wherein the spurious sequence of gradients is $\{0, 0.2, 0.2, 0.7, 0.7, 1, 0.7, 0.7, 0.2, 0.2, 0\}$.

59. The method of any one of the above aspects, wherein not both the first and second measures of any edge involve measuring widths or pixel counts at different gradient levels from a sequence of gradients across said any edge.

60. The method of any one of the above aspects, wherein, where both the first and second measures are evaluated from a sequence of gradients across the edge, not both the first and second measures depend on gradients to both sides of a peak gradient of the sequence of gradients.

61. The method of any one of the above aspects, wherein neither of the first and second measures is computed from one positive gradient and one negative gradient.

62. The method of any one of the above aspects, wherein the first measure does not necessarily produce a value that satisfies the criterion for every possible edge that has perfect reflection symmetry in samples of image data in a predetermined neighborhood of the edge about a line perpendicular to the edge and cutting through a midpoint of the edge.

63. A computer-readable medium that comprises computer-executable instructions that, when executed by a computing device, causes the computing device to execute a method according to any one of the above method aspects.

64. A circuit that generates a focus signal from a plurality of edges of an image of a scene to indicate a degree of image sharpness, comprising:
an edge detection and width measurement (EDWM) unit; and,
a focus signal calculator,
wherein the edge detection and width measurement unit detects edges in image data of the image, determines for the edges the relative extents they will contribute respectively to the focus signal, and evaluates edge-sharpness measures for edges that will contribute to the focus signal,
wherein the focus signal calculator generates a focus signal from the edge-sharpness measures, taking into account the respective relative extents,
wherein the edge detection and width measurement (EDWM) unit implements a method as described in any one of the above method aspects.

65. An image capture system, comprising:
a focus lens;
an aperture;
an image sensor comprising an image sensing pixel array;
a focus lens motor means; and,
a circuit according to Aspect 64.

BRIEF DESCRIPTION OF THE DRAWINGS

FIG. 6A, 6B are illustrations of a calculation of an edge width of a vertical edge having a slant angle φ;

FIG. 6C, 6D are illustrations of a calculation of an edge width of a horizontal edge having a slant angle φ;

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient of an image signal. The generator may also eliminate an edge that fails a template for an associated peaking in the gradient.

A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
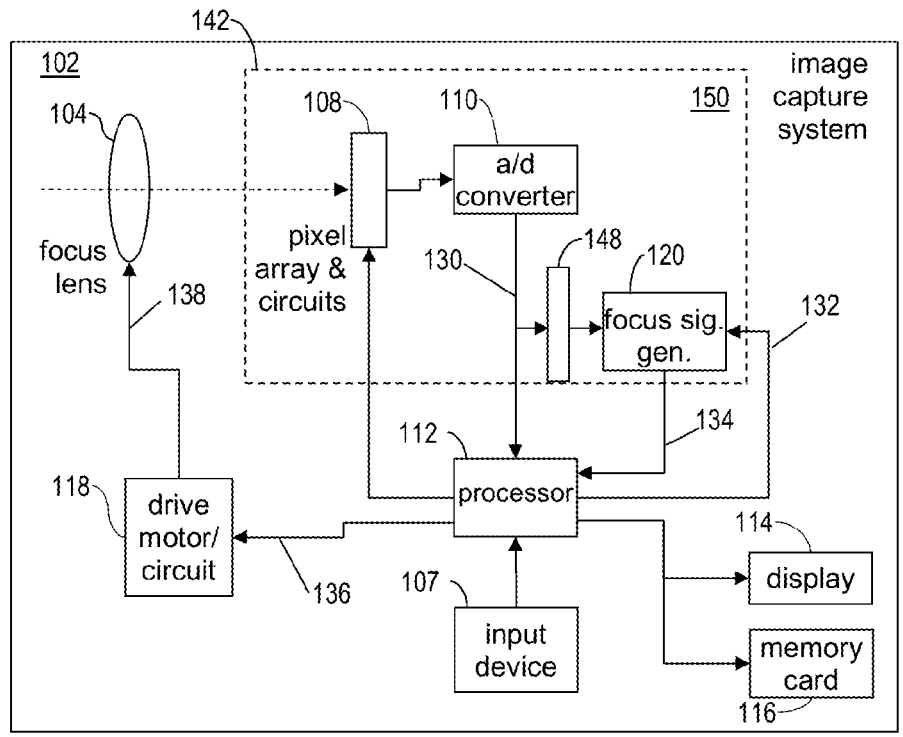
FIG. 1 is a schematic of an embodiment of an auto-focus image pickup apparatus.
Figure 2:
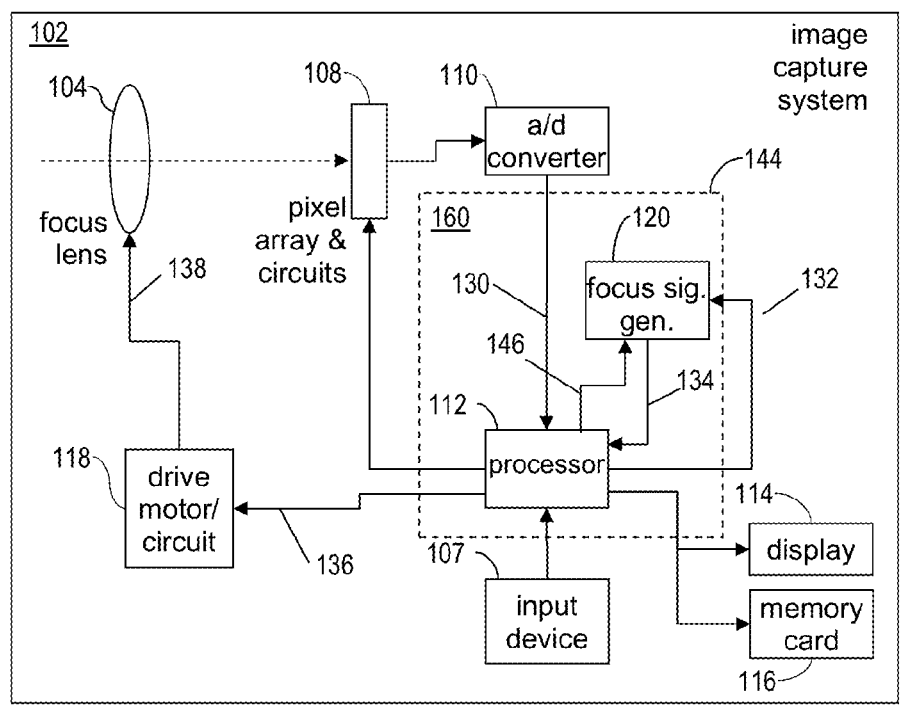
FIG. 2 is a schematic of an alternate embodiment of an auto-focus image pickup apparatus.

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternately, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternately, the pixel array and circuits 108, A/D Converter 110, and focus signal generator 120 may reside within a package 142 as image sensor 150 shown in FIG. 1, separate from the processor 112. Alternately, the focus signal generator 120 and processor 112 may together reside within a package 144 as a camera controller 160 shown in FIG. 2, separate from the pixel array 108 and A/D Converter 110. The focus signal generator 120 (or any alternative embodiment, such as one shown in FIG. 30) and the processor 112 may together reside on a semiconductor substrate, such as a silicon substrate.

Focus Signal Generator

Figure 3:
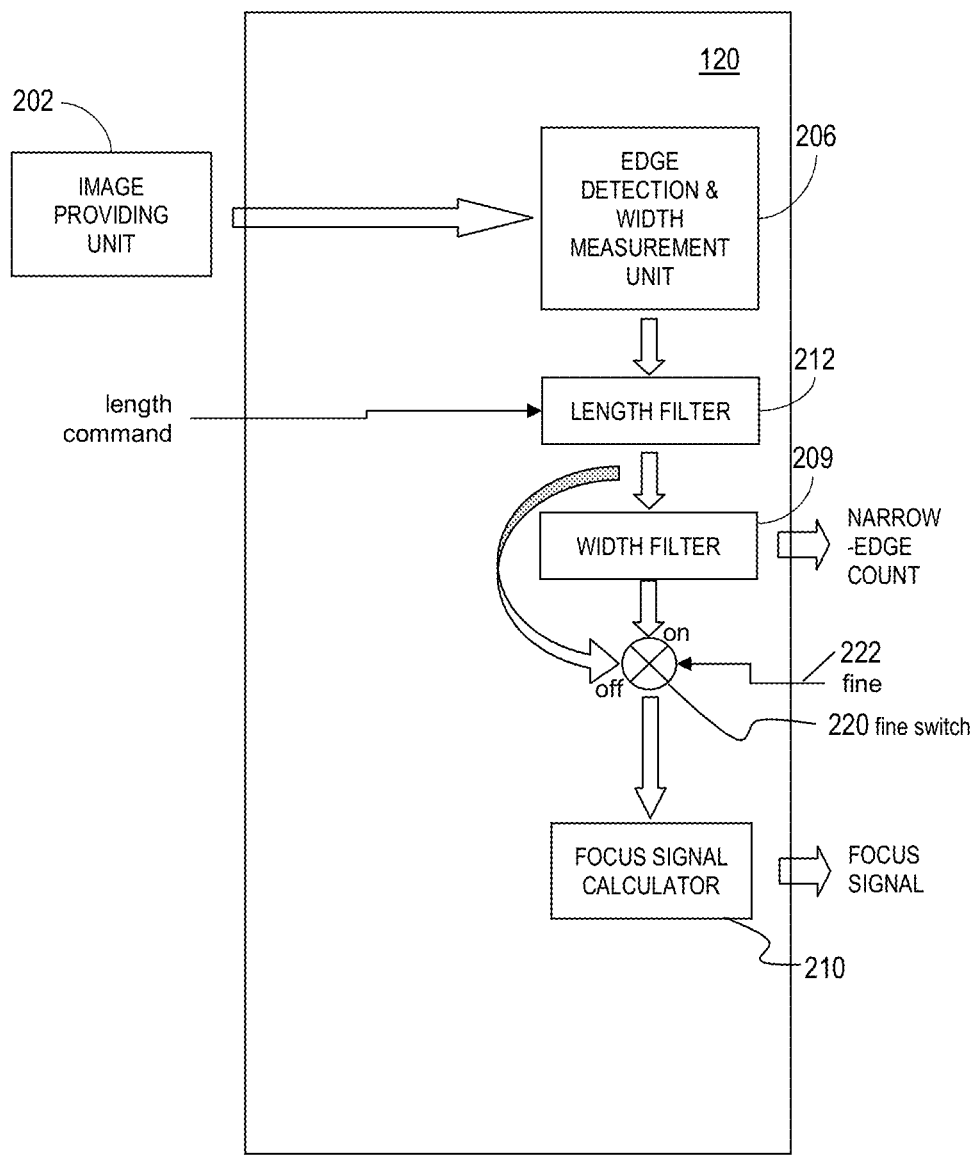
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, and a width filter 209. It may further comprise a fine switch 220 controlled by input 'fine' 222. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternately, both fine focus signal and gross focus signal may be calculated and output as part of output signals 134. The edge detection & width measurement unit 206 receives image(s) provided by the image providing unit 202. In the context of FIGS. 1 and 2, control signals, such as control signal 'fine' 222, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation $Y=0.2126*R+0.7152*G+0.0722*B$, where Y is luminance value. The single image signal may then be processed by a Gaussian filter or any lowpass filter to smooth out image data sample values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

The focus signal generator includes an edge detector to identify an edge in an image signal. The edge detector may use a first-order edge detection operator, such as Sobel operator, Prewitt operator, Roberts Cross operator, or Roberts operator. The edge detector may use a higher-order edge detection operator to identify the edge, for example a second order operator such as a Laplacian operator. The edge detector may use any one of the known edge detection operators or any improved operator that shares a common edge detection principle of any of the known operators.

Where the edge detector uses a first-order edge detection operator, a gradient (i.e. first derivative) of the image signal is computed. There are various methods available to calculate the gradient, including using any one of various first order edge detection operators such the Sobel operator, the Prewitt operator, the Roberts Cross operator, and the Roberts operator. The Roberts operator has two kernels which are single column or single row matrices: [−1 +1] and its transpose. The Roberts Cross operator has two kernels which are 2-by-2 matrices: [+1, 0; 0, −1] and [0, +1; −1, 0], shown in the format of [<first-row vector; second-row vector; third-row vector] like in Matlab. The Prewitt and the Sobel operator are basically have the same kernels, [−1, 0, +1] taking gradient in a direction of the row and its transpose taking gradient in a direction of the column, further multiplied by different lowpass filter kernels performing lowpass filterings perpendicular to the respective gradient directions. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation $Sx[k, q]=U[k, q+1]-U[k, q-1]$. Sobel Y-operator at the same location is given by the equation $Sy[k,q]=U[k+1,q]-U[k-1,q]$, where U is an image signal of the processed image.

Where the edge detector uses a second-order operator, a second derivative (such as the Laplacian) of the image signal is computed.

Orientation Tagging

Figures 4, 5:
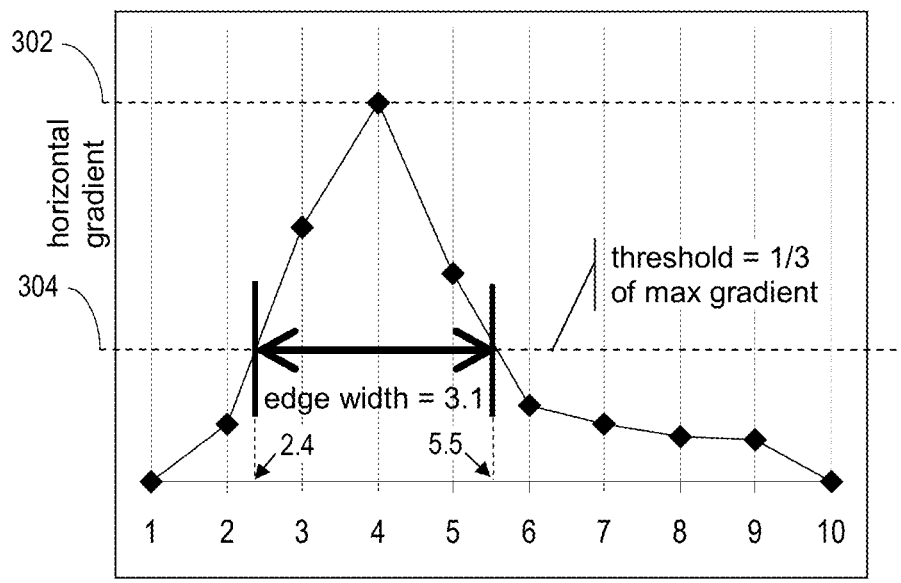
FIG. 4 is an illustration of a horizontal Sobel operator's operation on a image signal matrix.
FIG. 5 illustrates a calculation of edge width from a horizontal gradient.

Each pixel may be tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel may be tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has a direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5−2.4=3.1.

Another alternative edge width calculation method is to calculate a difference of the image signal across the edge (with or without edge refinement) and divide it by a peak gradient of the edge.

Alternatively, edge width may be a distance between a pair of positive and negative peaks (or interpolated peak(s)) of the second order derivative of the image signal across the edge. Other alternatives are possible, to be described under the heading "edge-sharpness measure" further into this specification.

It will be seen further into this specification under the heading "edge-sharpness measure" that there are other alternatives than a width, which is merely one example of a edge-sharpness measure that is essentially independent of illumination of the scene.

Slant Correction

Although each edge may be assigned to one prescribed direction (e.g. vertical direction or horizontal direction) or another, perpendicular, prescribed direction (e.g horizontal direction or vertical direction) and may have its edge width measured in a direction perpendicular to that assigned edge direction, the boundaries between regions of different image signal values in the image from which these edges arise may not be and usually are not aligned perfectly with either prescribed directions. In FIG. 6A, a boundary (shaded band) is shown to be inclined at a slant angle φ with respect to the vertical dashed line, and a width a is shown to be measured in the perpendicular direction (i.e. horizontal direction). However, a width b (as indicated in the drawing) measured in a direction perpendicular to the direction of the boundary (also direction of an edge that forms a part of the boundary) is more appropriate as the width of the boundary (and also of the edge) than width a. Such widths a that are not measured perpendicularly to the respective edge directions tend to be too large and do not represent the genuine thickness of the respective boundaries.

For purposes of calculating a focus signal from edge widths, the edge widths measured in one or the other of those prescribed directions are to be corrected by reducing them down to be widths in directions perpendicular to directions of the respective edges. The Edge Detection and Width Measurement Unit 206 performs such a correction on edge widths. As shown in FIG. 6A, the measured width a is the length of the hypotenuse of a right-angled triangle that has its base (marked with width b) straddling across the shaded boundary perpendicularly (thus perpendicular to the edge direction) and that has the angle φ. The corrected width b may then be obtained from a projection of the measured width a to the direction perpendicular to the edge direction. From elementary trigonometry, such a projection may be given by b=a cos(φ), but approximation may be used as long as it obtains accuracy to within 20%. The angle φ, or cos(φ) itself, may be found by any method known in the art for finding a direction of an edge in an image, or by a more accurate method described in the flowchart shown in FIG. 7.

Each horizontal or vertical edge's edge width may be corrected for its slant from either the horizontal or vertical orientation (the prescribed directions), respectively. FIG. 6A, 6B illustrate a correction calculation for an edge width measured in the horizontal direction for a boundary (and hence edges that form the boundary) that has a slant from the vertical line. FIG. 6C, 6D illustrate a correction calculation for an edge width measured in the vertical direction for a boundary (and hence edges that form the boundary) that has a slant from the horizontal line. The correction may be made by multiplying the edge width measured in a prescribed direction, such as a vertical direction or a horizontal direction, by a factor of cos $\phi$, where $\phi$ is an angle of slant from the prescribed direction.

Figures 7, 8:
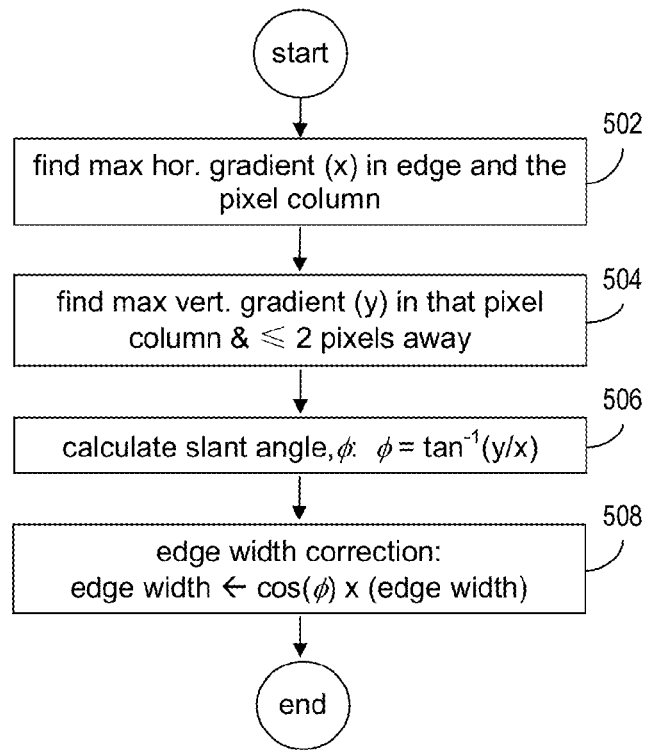
FIG. 7 is a flowchart of a process to calculate a slant angle φ and correct an edge width for a vertical edge having a slant.
FIG. 8 is an illustration of a vertical concatenated edge.

By way of example, FIG. 7 shows a flowchart of a process to correct edge widths for slant for edges inclined from a vertical line. (For horizontal edges, substitute 'row' for 'column', and interchange 'vertical' with 'horizontal' in the flowchart.)

From step 502 to step 506, a slant angle $\phi$ is found. For each vertical edge, at step 502, locate the column position where the horizontal gradient magnitude peaks, and find the horizontal gradient x. At step 504, find where the vertical gradient magnitude peaks along the column position and within two pixels away, and find the vertical gradient y.

At step 506, find the slant angle $\phi=\tan^{-1}(y/x)$. At step 506, the slant angle may be found by looking up a lookup table. Although steps 502 to 506 present one specific procedure and method to find the slant angle, other procedures and methods known in the art may be used instead.

Finally, at step 508, scale down the edge width by multiplying with $\cos(\phi)$, or with an approximation thereto as one skilled in the art usually does in practice.

A first modification of the process shown in FIG. 7 is to substitute for step 506 and part of step 508 by providing a lookup table that has entries for various combinations of input values of x and y. For each combination of input values of x and y, the lookup table returns an edge width correction factor. The edge width correction factor output by the lookup table may be an approximation to $\cos(\tan^{-1}(y/x))$ to within 20%, preferably within 5%. The edge width is then multiplied with this correction factor to produce a slant-corrected edge width.

A second modification is to calculate a quotient y/x between a vertical gradient y and a horizontal gradient x to produce a quotient q, then use q to input to a lookup table that has entries for various values of q. For each value of q, the lookup table returns an edge width correction factor. The edge width correction factor may be an approximation to $\cos(\tan^{-1}(q))$ to within 20%, preferably within 5%.

For finding the slant angle $\phi$ (or an approximation thereto such that the correction factor is accurate to within 20%) and subsequently the correction factor $\cos(\phi)$ (or an approximation thereto), or to directly find the correction factor without finding the slant angle $\phi$ (as in the first and second modifications), the values of x and y may be obtained in steps 502 to 506, but other methods may be employed instead.

A third modification is to perform the following for each one of a plurality of pixels in the edge: (a) find horizontal gradient x and vertical gradient y both for a pixel, (b) find q=y/x for this pixel, and (c) find a correction factor that corresponds to q, for instance $\cos(\tan^{-1}(q))$ or an approximation thereto to within 20%. Finally, find the correction factor for the edge width by averaging across the correction factor from each of the plurality of pixels. The average may be a weighted average, such as one in which a pixel that has a larger horizontal gradient is given a larger weight than another pixel that has a lesser horizontal gradient.

Other modifications are possible along these directions or other.

Screen Threshold

Figure 9A:
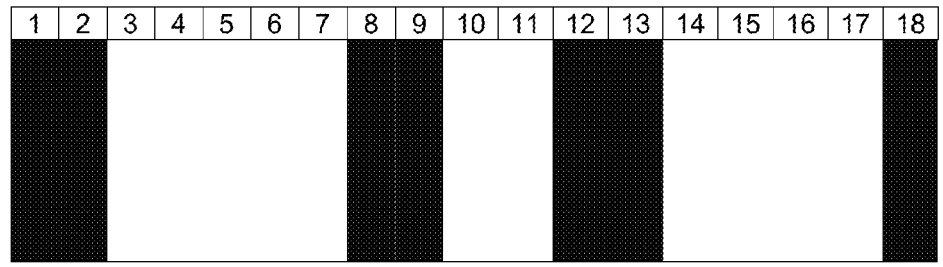
FIG. 9A is an illustration of a group of closely-packed vertical bars.
Figure 9B:
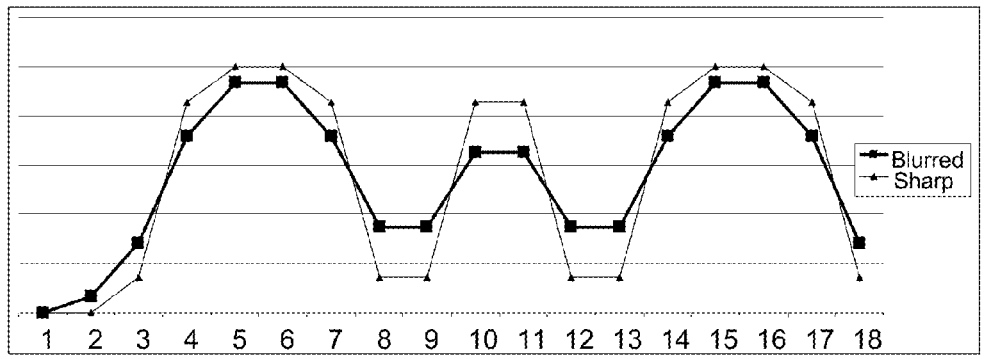
FIG. 9B is a graph of an image signal across FIG. 9A.
Figure 9C:
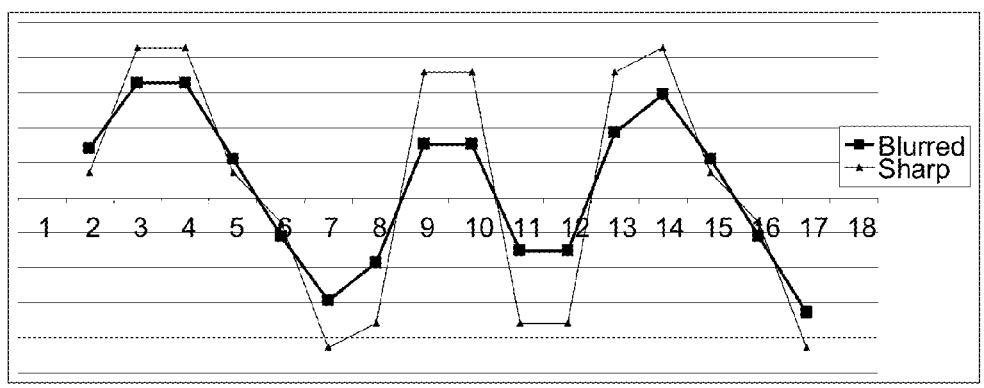
FIG. 9C is a graph of a horizontal Sobel gradient across FIG. 9A.

Adjacent edges may be prevented altogether from contributing to a focus signal, or have their contributions attenuated, if their peak gradient magnitudes are below a predetermined fraction of an adjacent wider edge's peak gradient magnitude. FIGS. 9A, 9B, and 9C illustrate a problem that is being addressed.

FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrower edges. The sharp image, on the other hand, changes less than 10% between the wider and the narrower edges.

The significant decline, e.g. 20% or greater, in peak gradient magnitude for a narrower edge adjacent to a wider edge having an opposite-signed gradient gives a hint that the blurred image is not well focused, and thus the narrower edge should not be relied upon as an indication that the blurred image is sharp.

Likewise, mutually adjacent edges of alternating gradient polarities should not be relied upon for such indication even if their edge width are small as long as they are in close proximity to each other, e.g. no more than 1 pixel apart ("minimum edge gap"). The minimum edge gap is in terms of a number of pixels, e.g. 1, or 2, or in between.

Furthermore, given that one edge may have been eliminated due to having a peak gradient less than the elimination threshold, two successive edges having an identical gradient polarity and spaced no more than two times the minimum edge gap plus a sharp_edge_width (sharp_edge_width is a number assigned to designate an edge width of a sharp edge) apart may be used as a condition for eliminating or demoting a contribution from one or both of the two mutually adjacent edges. either.

The Edge Detection and Width Measurement Unit 206 may execute the following algorithm for eliminating closely-packed narrower edges based on a screen threshold established from a wider edge, and a modulation screen flag that can be turned on and off.

Figure 10:
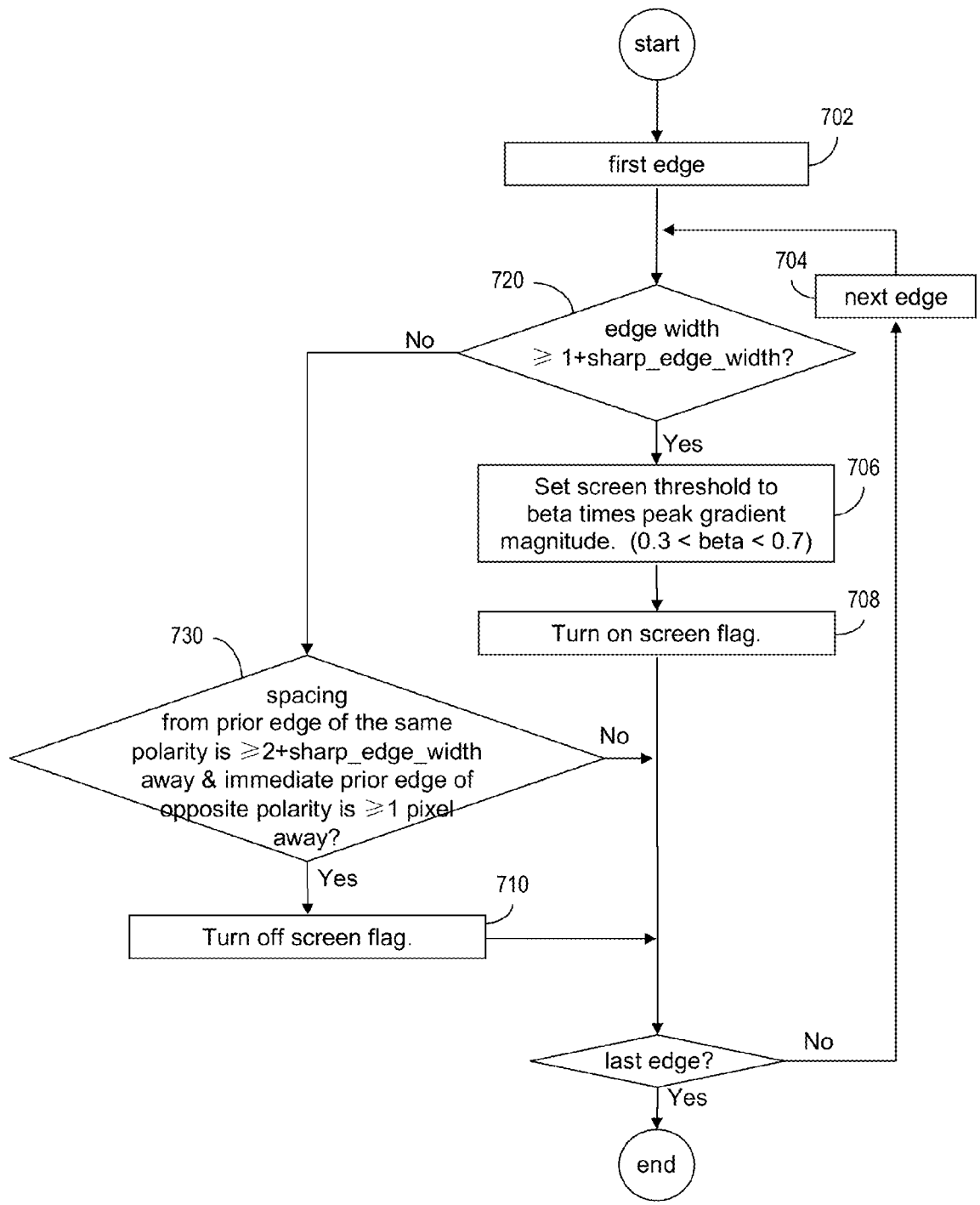
FIG. 10 is a flowchart of a process to eliminate closely-packed edges having shallow depths of modulation.

For each edge, the screen threshold and screen flag to be used for the immediate next edge of an opposite polarity are determined according to the process of the flowchart shown in FIG. 10.

Given the screen threshold and screen flag, an edge may be eliminated unless one of the following conditions is true: (a) the screen flag is off for this edge, (b) a peak gradient magnitude of the edge is not smaller than the screen threshold for this edge. To conditions (a) and (b) may be added condition (c) the edge width is not less than sharp_edge_width+1, where a number has been assigned for sharp_edge_width to designate an edge width of a sharp edge, and where the "+1" may be varied to set a range of edge widths above the sharp_edge_width within which edges may be eliminated if they fail (a) and (b). For the example shown in FIGS. 9A-9C, sharp_edge_width may be 2. FIG. 10 is a flowchart to determine a screen threshold and a screen flag for each edge. For vertical edges, assume scanning from left to right along a row, though this is not required. (For horizontal edges, assume scanning from top to bottom along a column, though this is not required.) A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used, such as between 0.5 and 2.0. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag for the next edge, then proceed to the next edge. If no, the edge is not a wider edge, and step 730 follows to check whether the spacing from the prior edge of the same gradient polarity is greater than two times the minimum edge gap (or a different predetermined number) plus sharp_edge_width and the immediate prior edge of an opposite polarity, if any, is more than the minimum edge gap away. If yes, step 710 follows to turn off the screen flag for the next edge. If no, keep the screen flag and the screen threshold for the next edge and proceed to the next edge. Beta may be a predetermined fraction, or it may be a fraction calculated following a predetermined formula, such as a function of an edge width. In the latter case, beta may vary from one part of the image to another part.

Alternative Embodiments

Orientation of the Pixel Grid:

The image input by the focus signal generator 120 may have pixels laid out in a rectangular grid ("pixel grid") rotated at 45 degrees with respect to a rectangular frame of the image. In this case, the X- and Y-directions of the edge detection operations and width measurement operations may be rotated likewise.

Edge-Sharpness Measures:

In the above description, sharpness of image of an edge is represented by a width of the edge measured from a sequence of gradients across the edge with the gradients oriented across the edge, there are alternatives that work on similar principle. In essence, what allows the focus signal generated in this manner is that the individual edges contributes a quantity (hereinafter "edge-sharpness measure") that is independent of scaling the image data by, for example, 20%, or essentially independent, such as changes by not more 5% for 20% scaling down of the image data, thus helping to make the focus signal independent of or far less dependent on illumination of the scene of the image or reflectivity of objects in the scene compared with the conventional contrast detection method.

In the present focus signal generator 120, any edge-sharpness measure that has the above characteristic of being independent of or essentially independent of 20% scaling down of the image data in addition is a good alternative to the width measured from a gradient or interpolated gradient to another gradient or interpolated gradient of a same gradient value.

The alternative edge-sharpness measure preferably has a unit that does not include a unit of energy. The unit of the edge-sharpness measure is determined on basis two points: (a) each sample of the image data on which the first-order edge-detection operator operates on has a unit of energy, (b) distance between samples has a unit of length. On basis of points (a) and (b), a gradient value has a unit of a unit of energy divided by a unit of length. Likewise, contrast across the edge or across any undivided portion of the edge has a unit of energy. Therefore the contrast is not a good edge-sharpness measure, as the unit reveals that it is affected by illumination of the scene and reflectivity of the object. Neither is peak gradient of the edge, because the unit of the peak gradient has a unit of energy in it, indicating also that it is responsive to a change in illumination of the scene. On the other hand, peak gradient of the edge divided by a contrast of the edge is a good edge-sharpness measure, as it has a unit of the reciprocal of a unit of length. As another example, the count of gradients whose gradient values exceeds a certain predetermine fraction of the peak gradient is a good edge-sharpness measure, as the count is simply a measure of distance quantized to the size of the spacing between contiguous gradients, hence having a unit of length.

It is here noted that, in the generation of the edge-sharpness measure, a gradient may be generated from a first-order edge detection operator used to detect the edge, or may be generated from a different first-derivative operator (i.e. gradient operator). For example, while the Sobel operator (or even a second-order edge detection operator, such as a Laplacian operator) may be used to detect the edge, the Roberts operator whose kernels are simply [−1, +1] and its transpose, which is simply subtracting one sample of the image data from the next sample in the orientation of the gradient operator, with the resulting gradient located midway between the two samples. Edges may be detected with a higher-order edge detection operator than first-order independently of one or more derivative operators used in generating the edge-sharpness measure or any of the shape measures described in the next section.

Viewing it another way, the edge-sharpness measure should have a unit of a power of a unit of length, for example a square of a unit of length, a reciprocal of a unit of length, the unit of length itself, or a square-root of a unit of length.

Any such alternative edge-sharpness measure can replace the edge width in the focus signal generator 120.

To correct for a slant of the edge, the correction factor as described above with reference to FIGS. 6A-6D and FIG. 7 (hereinafter "width correction factor") should be converted to adopt the same power. For example, if the edge-sharpness measure is peak gradient divided by a contrast, which gives it a unit of the reciprocal of a unit of length, then the appropriate correction factor for the edge-sharpness measure is the reciprocal of the correction factor described with reference to FIGS. 6A-6D and FIG. 7 above. As another example, if the edge-sharpness measure has a unit of a square of a unit of length, then the slant correction factor for the edge-sharpness measure should be a square of the width correction factor.

Several examples of alternative edge-sharpness measures are described below with reference to the drawings in FIG. 24B, FIG. 24D, FIG. 25, and FIG. 26.

Figure 24A:
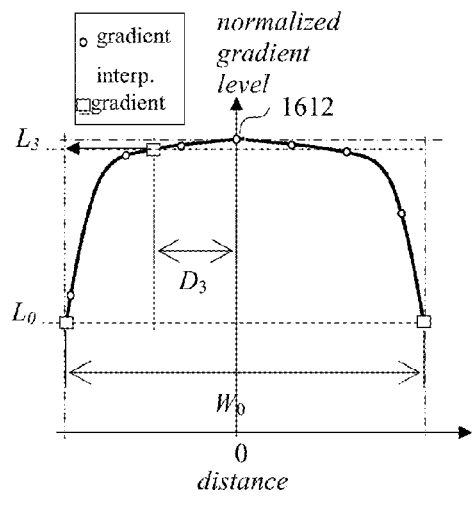
FIG. 24A illustrates a symmetrical sequence of gradients across an edge plotted against distance in multiples of a spacing between successive gradients, and a normalized gradient value of an interpolated gradient at a predefined distance from a peak gradient.
Figure 24B:
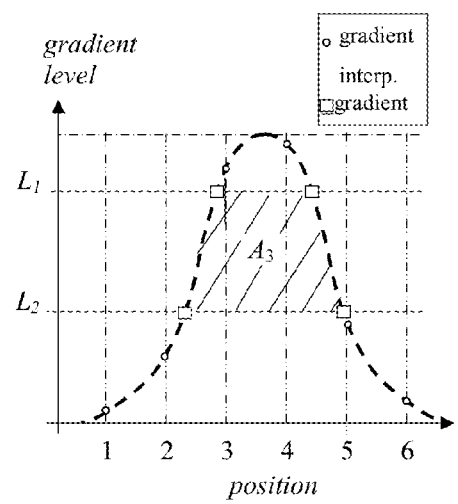
FIG. 24B illustrates a sequence of gradients across an edge plotted against distance in multiples of a spacing between successive gradients, and an area of a region under the plotted sequence of gradients.

FIG. 24B illustrates a sequence of gradients across an edge plotted against distance in multiples of a spacing between successive gradients, and an area $A_3$ of a shaded region under the plotted sequence of gradients. In this example, the region is defined between two gradient levels $L_1$ and $L_2$, which may be defined with respect to an interpolated peak gradient value (alternatively, the peak gradient value) of the sequence of gradients as, for example, predetermined portion of the interpolated peak gradient value. The shaded region has four corners of interpolated gradients. The area divided by the interpolated peak gradient value (alternatively, the peak gradient value) is a good edge-sharpness measure, as it has a unit of length. It is noted that alternative definitions of the region are possible. For example, the region may be bounded from above not by the gradient level $L_1$ but by the sequence of gradients.

Figure 24C:
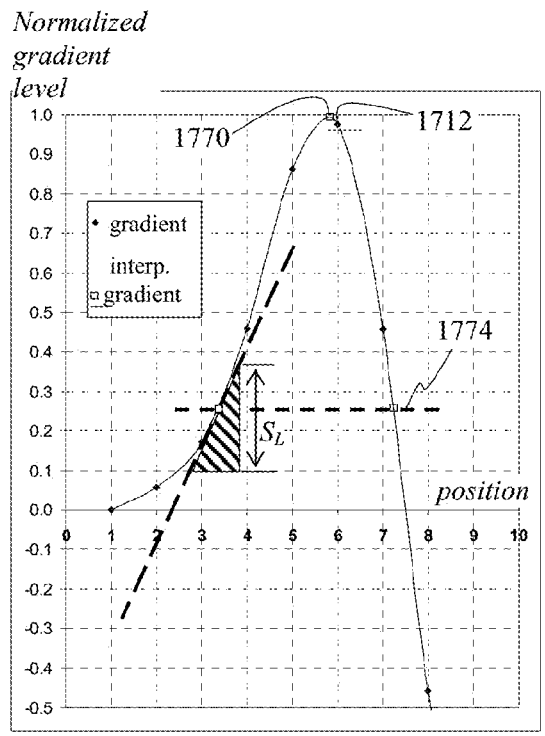
FIG. 24C illustrates a sequence of gradients of an image signal across an edge plotted against distance in multiples of a spacing between successive gradients, and a slope (i.e. second derivative of the image signal) of the plotted sequence of gradients taken at a gradient level defined with respect of an interpolated peak gradient.
Figure 24D:
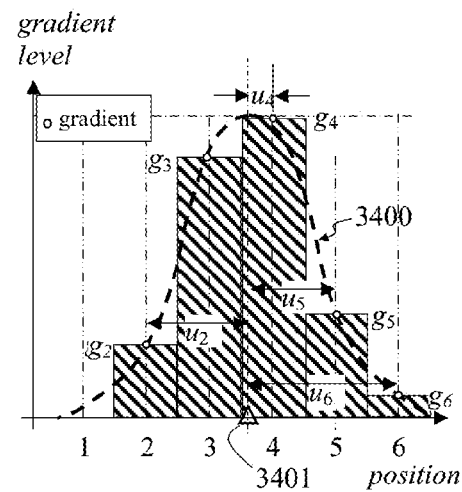
FIG. 24D illustrates a sequence of gradients of an image signal across an edge plotted against distance in multiples of a spacing between successive gradients, a center of gravity (i.e. center of moment), and distances of the gradients from the center of gravity.

FIG. 24D illustrates a sequence of gradients of samples of the image data across an edge plotted against distance in multiples of a spacing between successive gradients, a center of gravity 3401 (i.e. center of moment), and distances $u_2$, $U_2$, $U_4$, $u_5$ and $u_6$ of the gradients (having gradient values $g_2$, $g_3$, $g_4$, $g_5$ and $g_6$) from the center of gravity. A good edge-sharpness measure is a k-th central moment of the gradients about the center of gravity, namely a weighted average of the distances of the gradients from the center of gravity with the weights being magnitudes of the respective gradients, k being an even integer. For example, k can be 2, which makes the edge-sharpness measure a variance as if the sequence of gradients were a probability distribution. In this example, the edge-sharpness measure has a unit of a square of a unit of length. More generally, the edge-sharpness measure may be a function of distances of a plurality of gradients of a sequence of gradients from a position predefined relative to the plurality of gradients, the sequence being array across the edge. Other than the center of gravity, the predefined position may be an interpolated peak position for the sequence of gradients. A proper subset of the gradients of edge may be chosen according to a predefined criterion to participate in this calculation. For example, the gradients may be required to have gradient values at least a predetermined fraction of the peak gradient or gradient value of an interpolated peak of the sequence of gradients.

Figure 25:
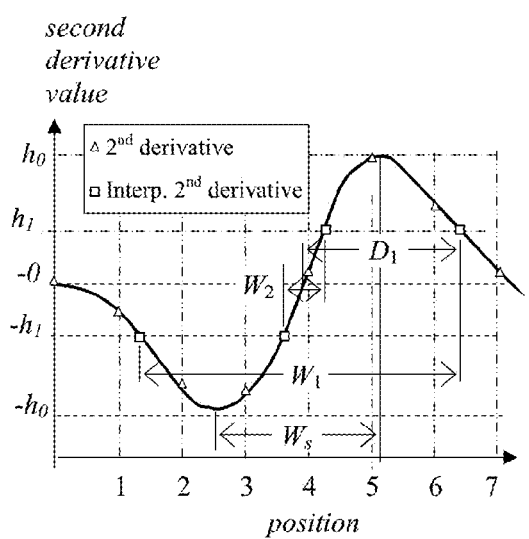
FIG. 25 illustrates a sequence of second derivatives of an image signal across an edge plotted against distance in multiples of a spacing between successive second derivatives, showing (a) a width $W_s$ between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$.

FIG. 25 illustrates a sequence of second derivatives of a sequence of samples of image data across an edge plotted against distance in multiples of a spacing between successive second derivatives, showing (a) a width $W_s$, between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$. Any one of the three widths $W_s$, $W_1$ and $W_2$ may used as the edge-sharpness measure.

In the example of FIG. 25, furthermore, the edge-sharpness measure may be a weighted sum of distances from the zero-crossing (between the pair of positive and negative peaks, and may be interpolated) of the second derivatives with the weights being magnitudes of the respective second derivatives. More generally, the edge-sharpness measure may be a function of distances of a plurality of second derivatives across the edge from a predefined position relative to the plurality of second derivatives. Other the zero-crossing position, a center of gravity is a good candidate for the predefined position, with the weights being magnitudes of the second derivatives. Yet another good candidate for the predefined position may be the midway point between the pair of positive and negative gradients.

Figure 26:
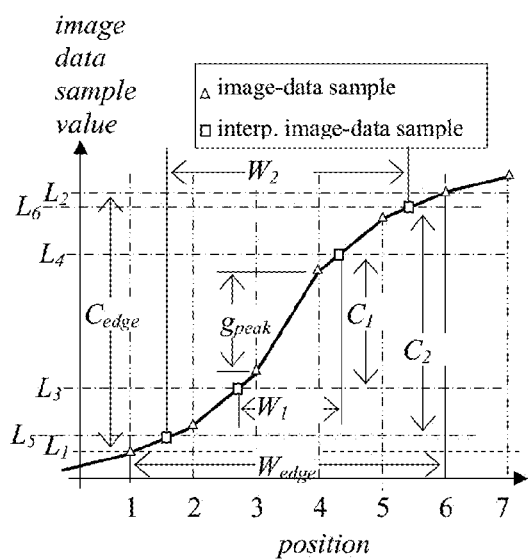
FIG. 26 illustrates a sequence of image data samples of the image signal plotted against distance in multiples of a spacing between successive samples, showing (a) a width $W_{edge}$ and a contrast $C_{edge}$ between two samples at two ends of the edge, (b) a peak gradient value $g_{peak}$ between a pair of samples that has a steepest change of sample value, (c) an undivided portion of the edge that has contrast $C_1$ and width $W_{part1}$, and (d) an undivided portion of the edge that has contrast $C_2$ and width $W_{part2}$.

FIG. 26 illustrates a sequence of samples of image data from pixels of an edge plotted against distance in multiples of a spacing between contiguous pixels, showing (a) a width $W_{edge}$ and a contrast $C_{edge}$ between two samples at two ends of the edge, (b) a peak gradient value $g_{peak}$ (generated by the Roberts operator) between a pair of samples that has a steepest change of sample value, (c) a narrowest undivided portion of the edge that has contrast $C_1$ and width $W_{part1}$, and (d) a narrowest undivided portion of the edge that has contrast $C_2$ and width $W_{part2}$. As mentioned before, the peak gradient value $g_{peak}$ divided by the contrast $C_{edge}$ is a good edge-sharpness measure. The width $W_{edge}$ is another good edge-sharpness measure. The widths $W_{part1}$ and $W_{part2}$ are also good alternatives. The contrasts $C_1$ and/or $C_2$ may be defined to be a predetermine portion of the edge contrast $C_{edge}$. I Alternatively, any one of them may be defined to be a predetermined multiple of a peak gradient of the edge, such as the peak gradient $g_{peak}$. It is also noted here that the "narrowest undivided portion" may be delimited by interpolated samples of image data, such as shown in squares in FIG. 26, or by rounding down or up to a nearest pixel count.

Edge Qualification

Figure 23A:
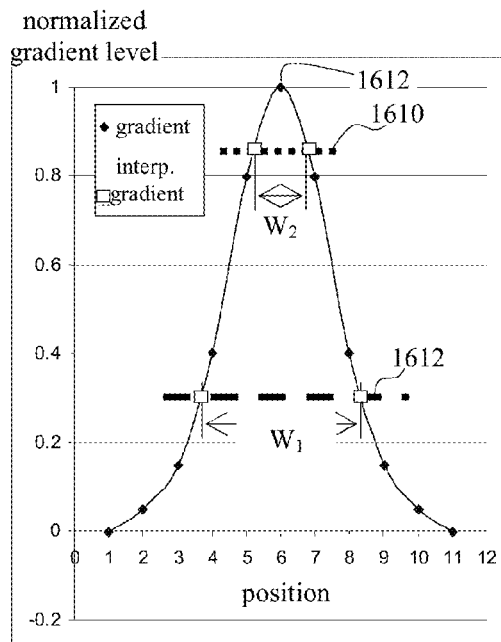
FIG. 23A illustrates a symmetrical sequence of gradients of an image signal across a good edge plotted against distance in multiples of a spacing between successive gradients, and two widths measured for two pairs of interpolated gradients, each pair at a different gradient level.
Figure 23B:
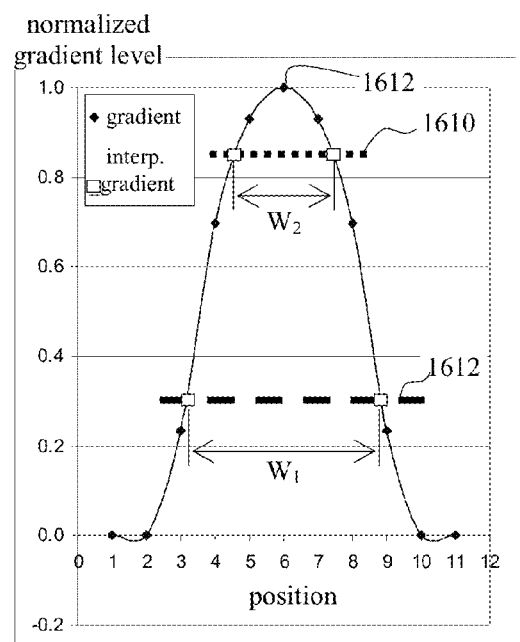
FIG. 23B illustrates another symmetrical sequence of gradients of an image signal across a spurious edge plotted against distance in multiples of a spacing between successive gradients, and two widths measured for two pairs of interpolated gradients, each pair at a different gradient level, ratio of the smaller width to the larger width being nearly double of that shown in FIG. 23A.

FIGS. 23A and 23B show a pair of symmetrical sequences of gradients of the image signal across a two different edges, plotted against distance in multiples of a spacing between successive gradients. In each figure, two widths (an upper width and a lower width) are measured for two pairs of interpolated gradients, each pair at a different gradient level.

It can be seen that, while the lower widths of the two sequences of gradients differ by merely 10%, the upper width in FIG. 23B is nearly double the upper width in FIG. 23A. Not both of them can be accepted as valid edges for deriving a reliable focus signal from.

It is recognized by this inventor that merely a single measurement made from samples of image data at and around the edge is insufficient to distinguish a spurious edge even though the spurious shape may have perfect reflection symmetry in gradients across the itself. This inventor recognizes that at least two measurements made from samples of the image data within a predefined neighborhood of the edge are necessary to determine that an edge should have be de-emphasized or omitted altogether from contributing to the focus signal.

The EDWM unit implements such a method to qualify edges for participation in generating the focus signal. The method is based on taking at least two measurements made from samples of the image data within a predetermined neighborhood of the edge (hereinafter "shape measures"). The predetermined neighborhood may be all the image data samples from which all gradients and/or second derivatives within the edge are computed from for detection of the edge. Alternatively, the predetermined neighborhood may be all pixels within a predetermined distance of the edge, for example 8 pixels, or a minimal distance sufficient to include all image data samples used for detecting the edge and/or computing the edge-sharpness measure of the edge.

Each shape measure of the edge is measured from at least two sample-pair differences, where each sample-pair difference is a difference between a pair of samples of image data, these samples being from a sequence of samples of image data arrayed across the edge.

The method then may determine to reduce a relative extent to which the edge contributes to the focus signal (as compared with other edges that contribute to the focus signal) depending on values of at least two shape measures for the edge. For example, where the focus signal is computed as a weighted average of all edges that are allowed to contribute, the weights having been already determined through other methods (such as the length filter described in the next section), the weight of the edge may be further reduced as compared to other edges by multiplying with a factor (hereinafter "shape-qualifying factor") computed from the determining as the relative extent.

The method may determine whether together the at least two shape measures meet a criterion in order to determine the relative extent to reduce the edge's contribution to the focus signal. For example, the criterion may be expressed as a boundary separating a region of no or little reduction in the relative extent from all other region(s) in a two-dimensional scatter plot of the first measure against the second measure.

Contours may be defined such that pairs of first-measure value and second-measure value that will be assign same relative extent are on same contour, and the relative extent is read from a memory by looking up to which contour the pair for the edge belongs. For example, the method may evaluate whether one of the at least two shape measures meets a criterion that depends on one or more of the other shape measures. For example, the criterion may require that a first shape measure is within a predetermined tolerance of an expected value, which is a function of the second shape measure. Following from the evaluating, the edge may be omitted or de-emphasized in generating the focus signal where the criterion is not satisfied. For example, where the edge is to be de-emphasized, the relative extent may be a function that varies between one value (e.g. one) for satisfying the criterion to another value for not satisfying the criterion (e.g. zero) and having a smooth transition with respect to variation of the difference between the value of the first measure and the expected value, and the relative extent can be used to reduce a weight of the edge in the focus signal by multiplying the weight with this relative extent prior to calculating the focus signal, where the focus signal is a weighted average from edges that contribute to it. Such function preferably assumes a shape of a sigmoid function with respect to the difference.

Alternatively, the method may compute the relative extent as a function of the at least two shape measures. For example, the relative extent may be computed as X/E, where E is the expected value (found from plugging the measured value for the edge for the second measure into the function) and X is the measured value for the first shape measure.

Figure 28:
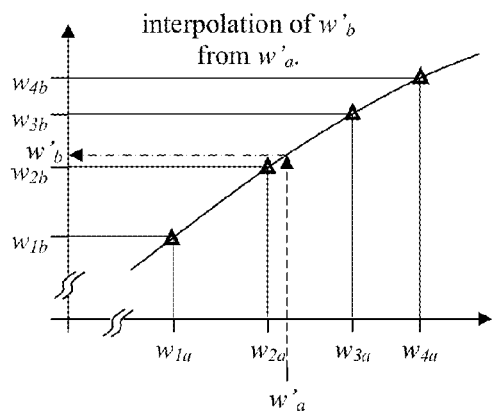
FIG. 28 shows a scatter plot of four pairs of expected values of first and second shape measures $(w_{1b}, w_{1a})$, $(w_{2b}, w_{2a})$, $(w_{3b}, w_{3a})$, $(w_{4b}, w_{4a})$, and illustrates a value $w'_a$ for the first shape measure is found by interpolation from a value $w'_b$ for the second shape measure.
Figure 29:
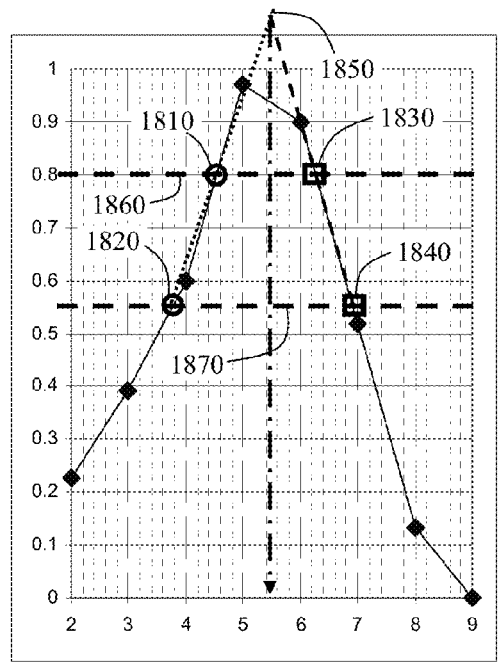
FIG. 29 illustrates finding an interpolated peak's position by interpolation.

The expected value of the first measure in terms of the second measure may be expressed in a mathematical formula recorded in a computer-readable medium, such as a non-volatile memory (for example flash memory), and retrieved into the EDWM unit for execution. Alternatively, a lookup table stored in the computer-readable medium can be used. Referring to FIG. 28 shows a scatter plot of four pairs of values of first and second shape measures ($w_{1b}$, $w_{1a}$), ($w_{2b}$, $w_{2a}$), ($w_{3b}$, $w_{3a}$), ($w_{4b}$, $W_{4a}$), and illustrates a value $w'_b$ for the first shape measure is found by interpolation from a value $w'_a$ for the second shape measure. The lookup table may store pairs of values first and second measures and the EDWN retrieve pairs for interpolation to find expect value of one shape measure given measured value of another shape measure.

It is noted here that the method does not determine the relative extent on basis of an extent to which a sequence of gradient across the edge departs from a perfect reflection symmetry. In particular, as described immediately under the present heading with reference to FIGS. 23A and 23B, which each plots a perfectly symmetrical sequence of gradients of an edge, there are edges the method will discriminate against despite the edges having perfect reflection symmetry in their respective sequences of gradients across themselves. It will be clear from the examples later in this section that having perfect reflection symmetry in a sequence of gradients across the edge will not prevent an edge from being discriminated against (i.e. having its relative extent reduced).

Figure 27A:
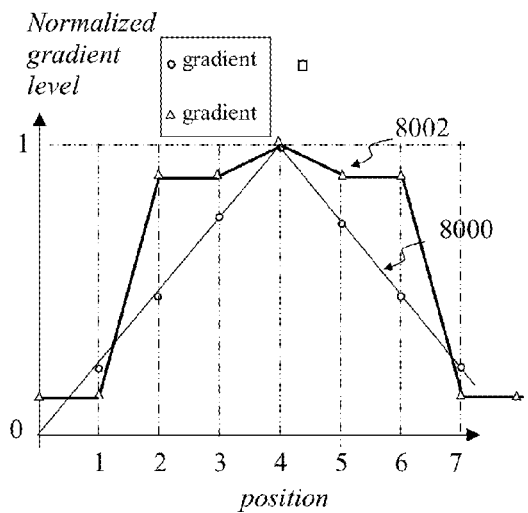
FIG. 27A illustrates two symmetrical sequences of gradients plotted against distance in multiples of a spacing between successive samples of each sequence, the sequences normalized with respect to their respect peak gradients, where the plot for one sequence has a triangular shape and the plot for the other sequence has a shape of a hat.
Figure 27B:
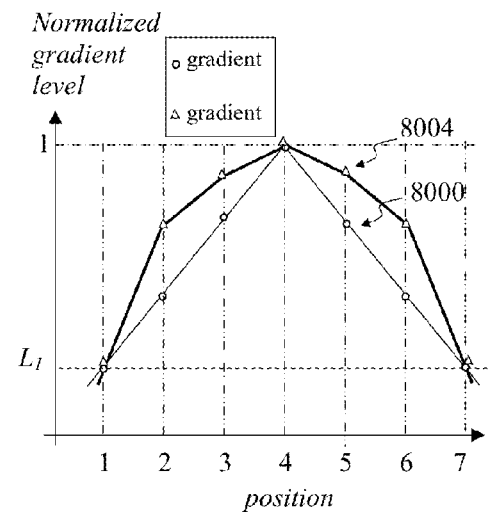
FIG. 27B illustrates two symmetrical sequences of gradients plotted against distance in multiples of a spacing between successive samples of each sequence, the sequences normalized with respect to their respect peak gradients, where the plot for one sequence has a triangular shape down to a normalized gradient level and the plot for the other sequence has a shape of a dome.

More specifically, there is a sequence of gradients having perfect reflection symmetry such that if an edge has the sequence of gradients across itself then its relative extent will be reduced under this method. As an example, such a sequence may be {0.1, 0.15, 0.2, 0.9, 0.9, 1, 0.9, 0.9, 0.2, 0.15, 0.1}. As another example, such sequence may be {0, 0.2, 0.2, 0.7, 0.7, 1, 0.7, 0.7, 0.2, 0.2, 0}, which is sequence 8002 shown in FIG. 27A to take a shape of a hat. As a third example, such a sequence may be {0, 0.25, 0.5, 0.75, 1, 0.75, 0.5, 0.25, 0}, which is shown as sequence 8000 in FIG. 27B in a shape of a isosceles triangle.

One of the shape measures may be the edge-sharpness measure, but this is not necessary. Where the edge-sharpness measure is not one of the shape measures and the edge is disqualified (i.e. omitted) from contributing to the focus signal, computing of the edge-sharpness measure for the edge may be omitted.

The shape measures are mutually independent in a sense that any shape measure cannot be computed from the other shape measures without further involving at least one sample of image data from the predetermined neighborhood of the edge for which said any shape measure is computed.

Preferably, a shape measure is not computed from one positive gradient and one negative gradient for every edge for which the shape measure is computed. For most edges, to find an interpolated gradient on the edges does not require interpolating between a positive gradient and a negative gradient.

Preferably, evaluating a shape measure for an edge does not depend upon detection of another edge. Frequently, an edge has its own distribution of normalized gradients that is independent of another edge, and a shape measure formulated based such characteristic of the edge is not affected by detection or not of the other edge, especially if the predetermined neighborhood of the other edge and this edge do not overlap.

Preferably, a shape measure is not chosen to measure an edge unless a 20% decrease the scene will not result in difference between whether the edge is omitted or allowed to contribute to the focus signal. Alternatively, a shape measure is preferably not chosen to measure an edge unless a 20% decrease in the image signal values within the predetermined neighborhood will not result in whether the edge is omitted or accepted to contribute to the focus signal.

In general, any of the methods described under the heading "Edge-sharpness measures" for computing a edge-sharpness measure can be used to create one or more shape measures, as long as all shape measures and the edge-sharpness are computed differently. For example, with reference to FIG. 23B, a first shape measure may be the width $W_2$ between two interpolated gradients at the upper normalized gradient level 3310 and a second shape measure the width $W_1$ measured between a pair of interpolated gradients at the lower gradient level 3312. The second shape measure may also be used as the edge-sharpness measure for the edge of this example. Alternatively, the edge-sharpness measure may be measure at a third normalized gradient level different than the upper 3310 and lower 3312 normalized gradient levels. Still alternatively, either the second measure or the edge-sharpness measure may be measured using another shape measure method, for example as a function of distances of the gradients over the edge from a predefined position (e.g. a center of gravity), where a second moment of the distances is one example of such function of distances of the gradients, or for example as a distance between the outer pair of interpolated second derivatives interpolated from a sequence of second derivatives arrayed across the edge.

The example discussed above with respect to FIG. 23B and using two widths (or even pixel counts, which is a quantized distance quantized to the spacing between adjacent pixels) measure at two different gradient levels, other combinations are possible, as discussed further examples below.

Furthermore, any of the methods to make edge-sharpness measure that uses a normalizing with respect to a power of a peak gradient value or interpolated peak gradient value may bypass the normalizing to generate a shape measure that is not free of a unit of energy within the unit of the shape measure.

For example, where the edge-sharpness measure is made by measuring an area of a region under a sequence of gradients (see FIG. 24B and its related discussion under the heading "Edge-sharpness measures") and normalizing the area by a peak gradient value or interpolated peak gradient value, the normalizing may be avoided, resulting in a area for a shape measure having a unit of a unit of gradient times a unit of length, thus a unit of energy.

In addition to any one of the edge-sharpness measure methods, a shape measure can draw on other methods. Further examples are described below.

FIG. 24A illustrates a symmetrical sequence of gradients across an edge plotted against distance in multiples of a spacing between successive gradients, and a normalized gradient value of an interpolated gradient at a predefined distance $D_3$ from a peak gradient. This sequence of gradients has a peak gradient 3212. A width $W_0$ measured at normalized gradient level $L_0$ can be used as the second shape measure. The distance $D_3$ may be defined with respect to width $W_0$, for example as a predetermined fraction of the width $W_0$, or with respect to another width of the edge measured from any one of the edge-sharpness measures, for example as a predetermine multiple of a square-root of a variance of the distances of the gradients from a center of gravity of the gradients. At the distance $D_3$, a normalized interpolated gradient value $L_3$ is computed. This interpolated gradient value will vary for different sequences of gradients that have the same width $W_0$ at the gradient level $L_0$ but whose gradient values decline faster with distance from the peak gradient 3212 than the present sequence of gradient shown in FIG. 24A. Hence the pair ($D_3$, $W_0$) may be check against a criterion to find the relative extent for an edge from its sequence of gradient.

FIG. 24C illustrates a sequence of gradients of an image signal across an edge plotted against distance in multiples of a spacing between successive gradients, and a slope $S_L$ (i.e. normalized second derivative of the image signal) of the plotted sequence of normalized gradients taken at a normalized gradient level 3274 defined with respect of an interpolated peak 3270. Between this sequence of gradients and the sequence of gradients shown in FIG. 24A, it is clear that for the same width at the normalized gradient level $L_0$, the slope measured at this level or another normalized gradient level will be different between the shape of the present sequence of gradients and the one shown in FIG. 24A. These sequences cannot both be good for generating the focus signal. Therefore the slope is also a candidate method for a shape measure.

As another method for a shape measure, a sum of a power of a plurality of normalized gradient values from a sequence of gradients across the edge can be used. Additionally, if this sum is further normalized by the same power of a peak gradient value or of an interpolated peak's gradient value, it can be used as a edge-sharpness measure and has a unit of a reciprocal of a unit of length.

Between a first shape measure and a second shape measure used for determining the relative extent of the edge, both shape measures may be chosen such that both are not affected by scaling the samples of image data from the aforementioned predetermined neighborhood of the edge. For example, as in the above discussion with reference to FIG. 23B, both widths $W_1$ and $W_2$ are not affected by scaling the image data that enter the computation of the gradients in the sequence of gradients displayed. Alternatively, both measure be chosen so that they are both affected by same. For example, the first measure may be the interpolated gradient value $L_3$ at a predefined distance $D_3$ from an interpolated peak or a peak gradient of the sequence of gradients, as shown in FIG. 24A and discussed above, and the second measure may be an area of a region under the sequence of gradients plotted against distance, as shown in FIG. 24B and discussed above, but without normalizing.

It is noted that, in this disclosure, a quantity from an edge, such as a gradient level, is said to be normalized when it is divided by, by default unless otherwise specified, either a peak gradient value of the edge or gradient value of an interpolated peak. For example, in FIG. 23B, peak gradient 3212 has a normalized value of exactly 1, whereas in FIG. 24C the interpolated peak 3270 is different from the peak gradient 3212, and the gradients shown in FIG. 24C are normalized with respect to the interpolated peak 3270, not the peak gradient 3212.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112", for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N. The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210, wherein the edges processed by the Length Filter 212 are those that pass through the width filter 209 depending on the 'fine' signal.

In an alternate embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
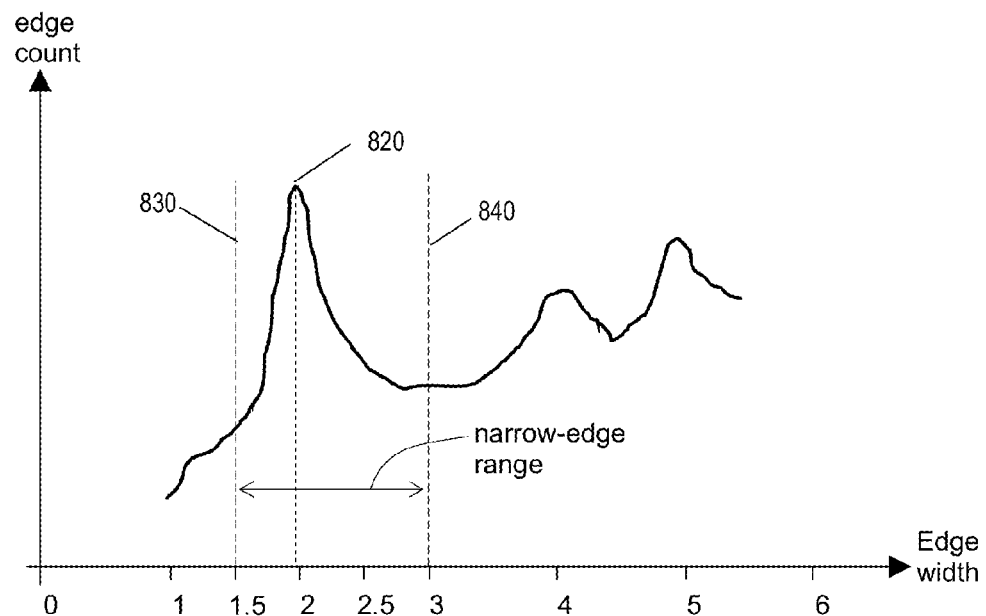
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter 209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i / \Sigma w_i$, where $e_i$ are the edge widths, $w_i$ are the weights, where here $w_i=c_i$, $c_i$ being the edge count at edge width $e_i$, i being a bin number of a histogram of edge widths. Alternately, the weight at each edge width may be the edge count for the edge width multiplied by the edge width itself, i.e. $w_i=c_i e_i$. In addition, preferences from the Width Filter 209 that are expressed in terms of weights may be further multiplied to each edge width. For example, for weights $\Omega_i$ produced by the Width Filter 209, $\Sigma\Omega_i=1$, focus signal may be calculated as $\Sigma\Omega_i w_i e_i / \Sigma\Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
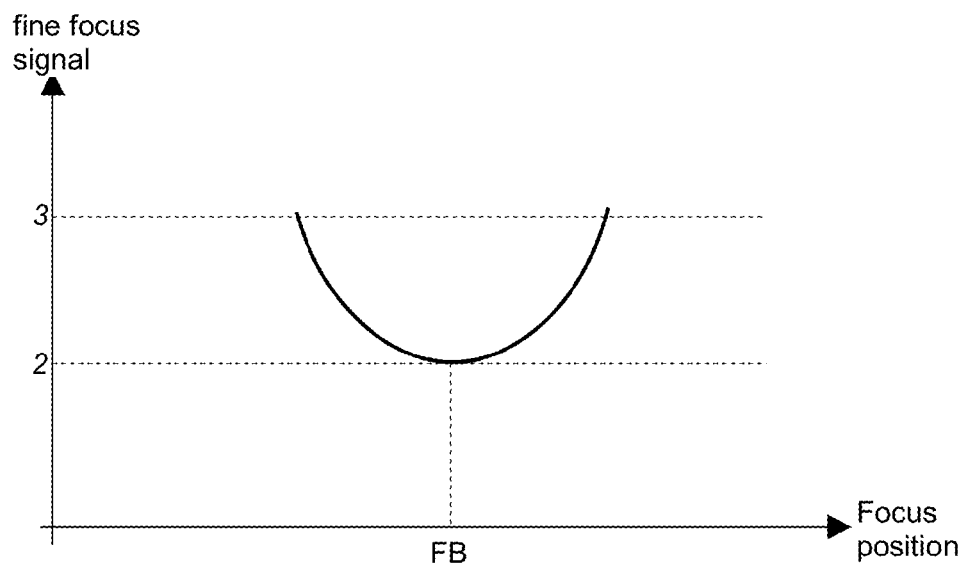
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge_width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
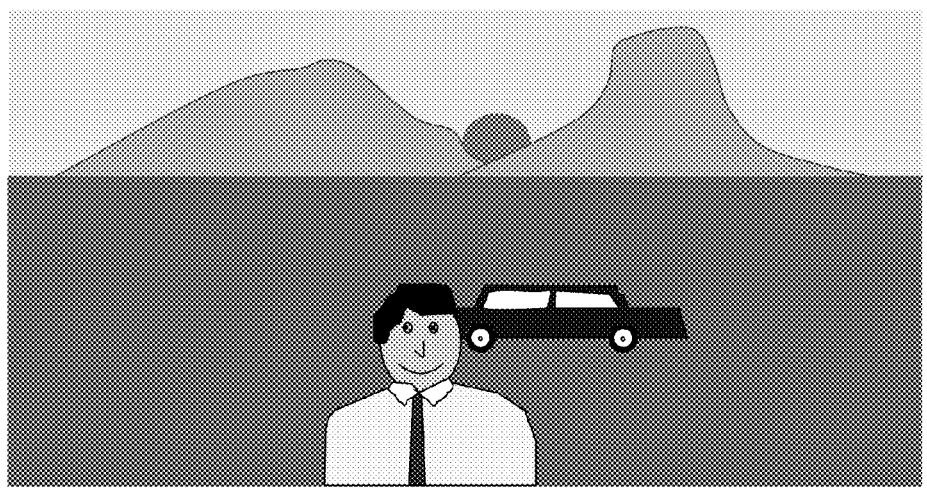
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
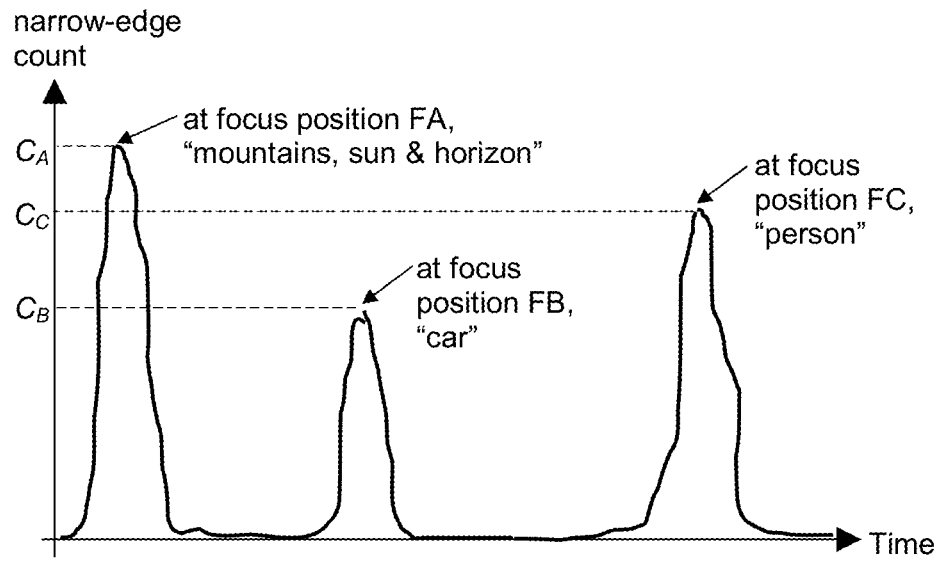
FIG. 13 is a graph illustrating a variation of a narrow-edge count during a focus scan of the scene of FIG. 12.

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
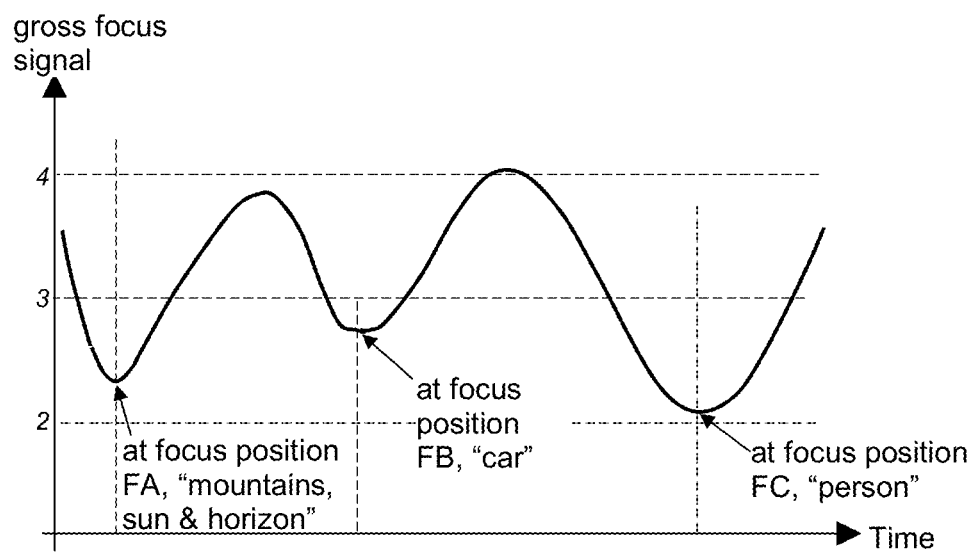
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp edge width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp edge width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
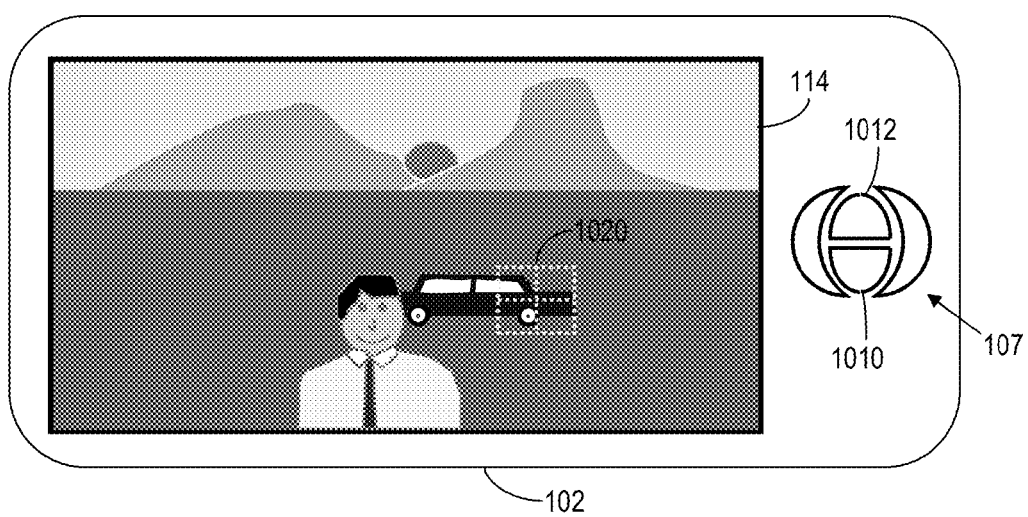
FIG. 16 is an illustration of an apparatus displaying multiple objects in a scene and a selection mark over one of the objects.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touch-screen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp edge width.

Alternate Embodiments

Figure 17:
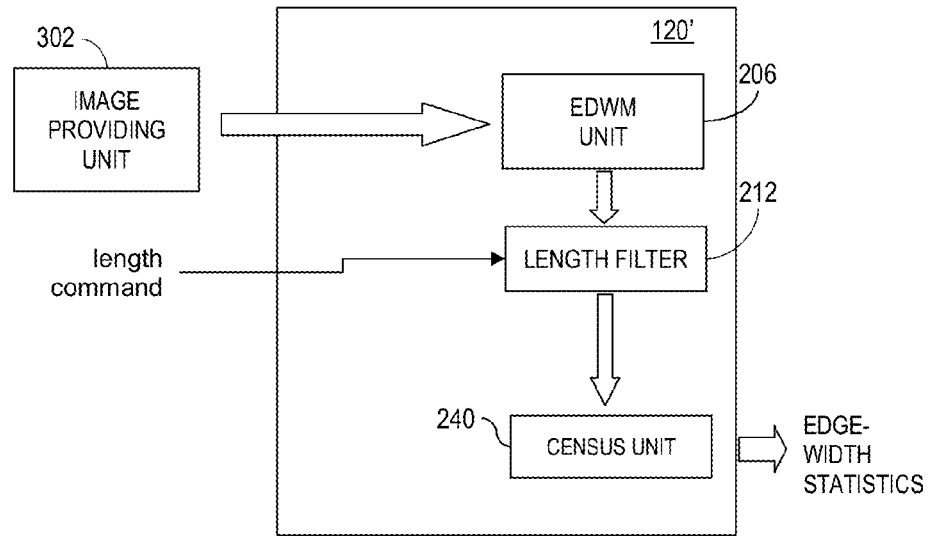
FIG. 17 is a block diagram of an alternate embodiment of a focus signal generator.

FIG. 17 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 18:
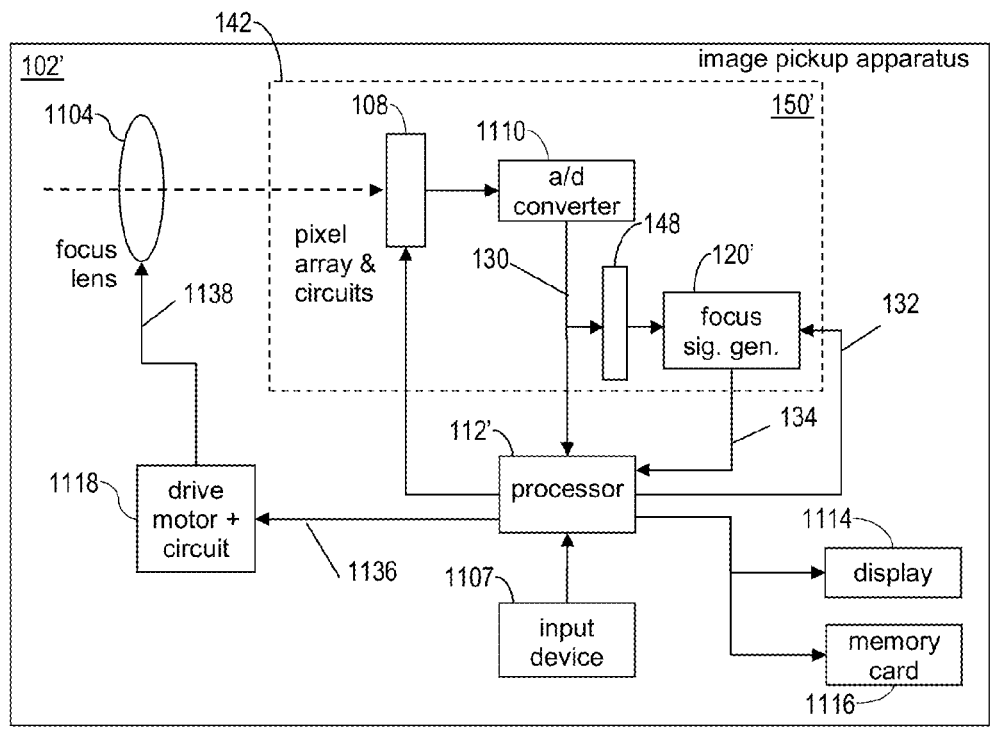
FIG. 18 is a schematic of an alternate embodiment of an auto-focus image pickup apparatus.

Referring to FIG. 18, the edge-width statistics thus provided in signals 134 to an alternative embodiment of processor 112' in an alternative auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Auxiliary Pixel Array

Figure 19:
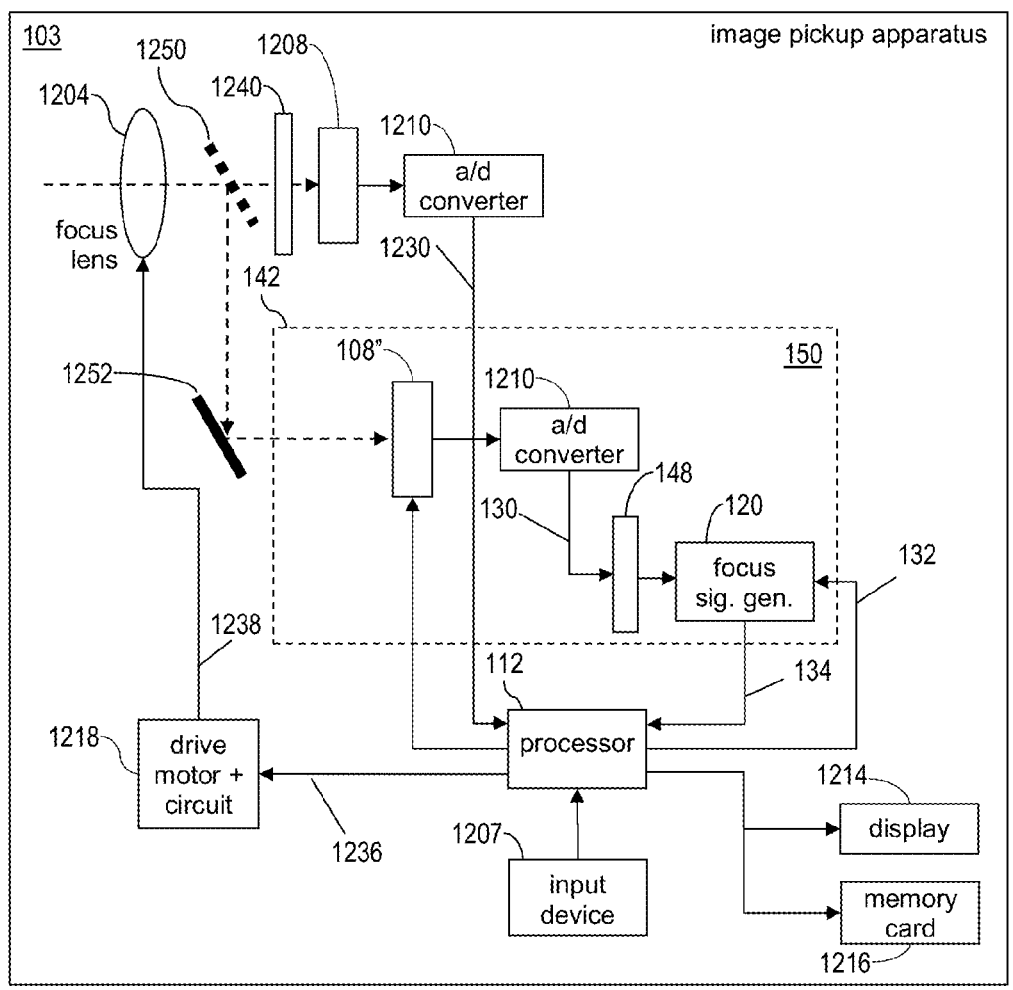
FIG. 19 is a schematic of an embodiment of an auto-focus image pickup apparatus having a main pixel array and an auxiliary pixel array.

FIG. 19 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. The ratio of light intensity of the first beam to the second beam may be 1-to-1 or greater than 1-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

Figure 22:
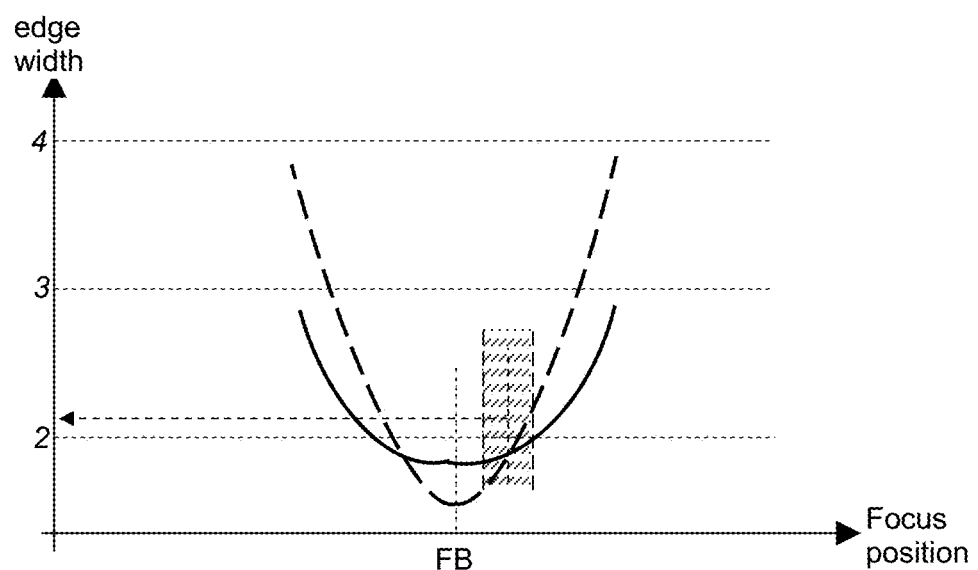
FIG. 22 is an illustration of a variation of an edge width from a main pixel array and a variation of an edge width from an auxiliary pixel array at different focus positions.

FIG. 22 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp edge width, since moiré due to aliasing is not as critical in the auxiliary image, as it is not presented to the user as a final image. This helps to sharpen the slope below and above the sharp edge width. The sharper slope is also helped by the auxiliary pixel width being smaller than the main pixel width.

The shaded region in FIG. 22 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images.

The auxiliary pixel array 108", A/D Converter 110, focus signal generator 120 together may be housed in a package 142 and constitute an auxiliary sensor 150. The auxiliary sensor 150 may further comprise a color interpolator 148.

Figure 20:
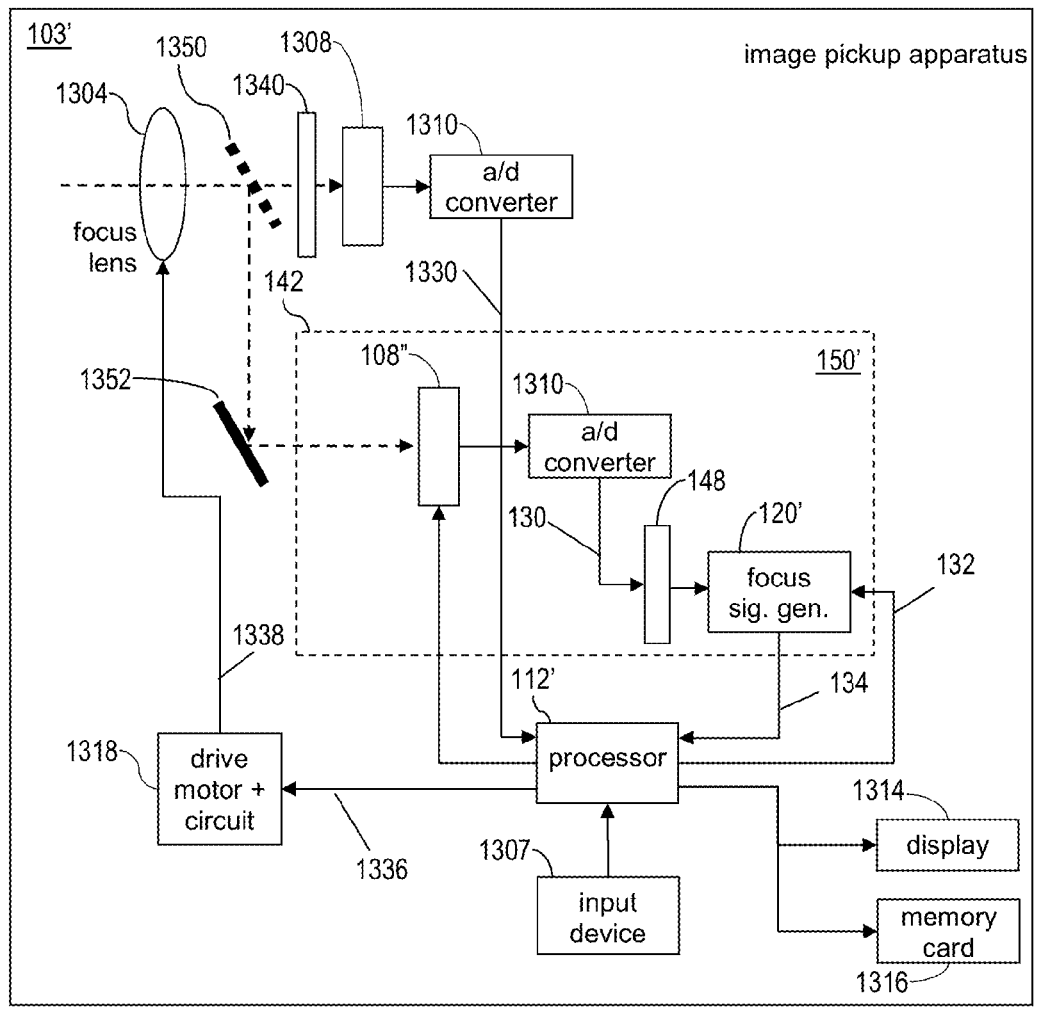
FIG. 20 is a schematic of an alternate embodiment of an auto-focus image pickup apparatus having a main pixel array and an auxiliary pixel array.

FIG. 20 shows an alternative embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

Figure 21:
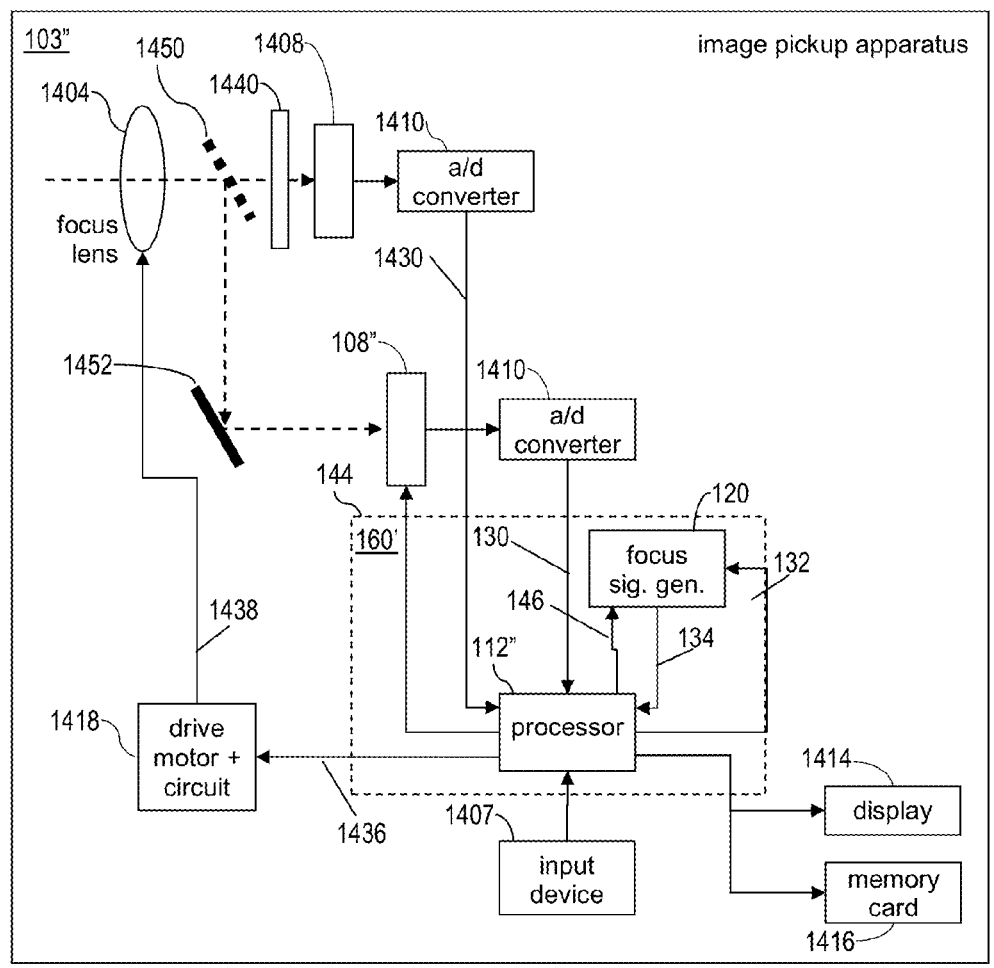
FIG. 21 is a schematic of an alternate embodiment of an auto-focus image pickup apparatus having a main pixel array and an auxiliary pixel array.

FIG. 21 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209.

Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

Figure 30:
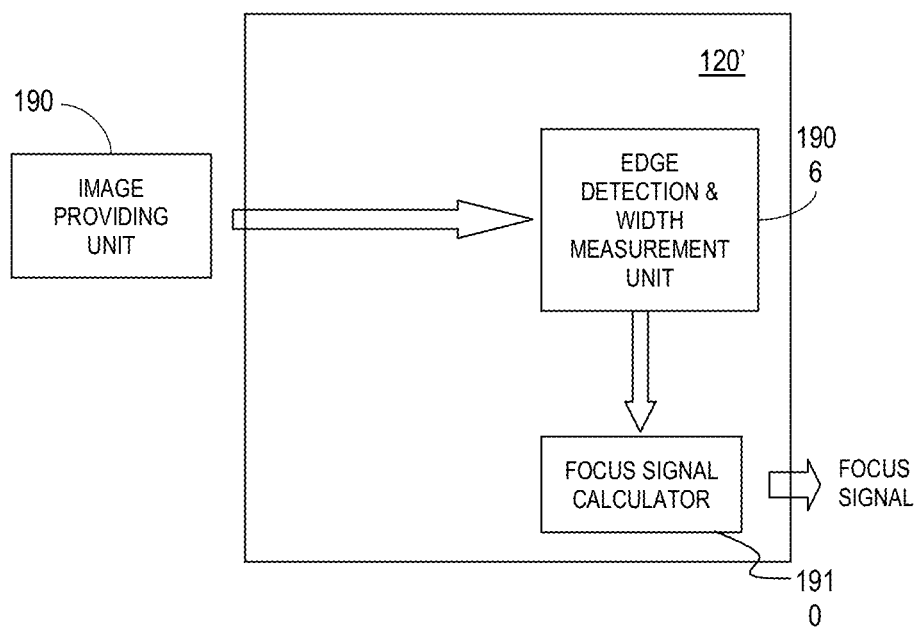
FIG. 30 shows an alternate embodiment of a focus signal generator.

FIG. 30 shows yet another embodiment of focus signal generator 120'. This embodiment may be employed in any of the above image capture systems.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those. One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A method for generating a focus signal from a plurality of edges of an image of a scene to indicate a degree of image sharpness, comprising:

evaluating in a computing device a first measure and a second measure on an edge detected from the image to find a first value and a second value, respectively; and, determining by use of at least the first and second values a relative extent to which the edge weighs in contributing to the focus signal as compared with other edges that contribute to the focus signal, wherein the first and second measures of any edge are each a quantity that depends on at least two image-sample differences, each image-sample difference being a difference between a pair of samples of image data, the samples being from a sequence of image data samples across said any edge, wherein the determining is not based on measuring an extent to which a sequence of gradients across the edge lacks reflection symmetry.

2. The method of claim 1, wherein the evaluating the first measure does not depend upon detection of another edge.

3. The method of claim 1, wherein a 20% decrease in an illumination of the scene does not result in a difference whether the edge is omitted or allowed to contribute to the focus signal.

4. The method of claim 1, wherein the determining determines the relative extent by comparing the first value with a predetermined criterion that depends on at least the second value.

5. The method of claim 4, further comprising: omitting or deemphasizing the edge in the generating of the focus signal where the edge does not meet the predetermined criterion.

6. The method of claim 1, wherein the determining determines the relative extent as a function of at least the first and second measures.

7. The method of claim 6, wherein the relative extent is a weight for a contribution of the edge towards the focus signal.

8. The method of claim 1, wherein any edge that contributes to the focus signal contributes an edge-sharpness measure that is a quantity computed from a plurality of samples of image data within a predetermined neighborhood of said any edge.

9. The method of claim 8, wherein the edge-sharpness measure is also the second measure.

10. The method of claim 8, wherein the edge-sharpness measure is neither the first measure nor the second measure.

11. The method of claim 10, wherein the edge-sharpness measure of said any edge is not evaluated where said any edge is omitted from the generating of the focus signal.

12. The method of claim 10, wherein the edge-sharpness measure of said any edge is a width of a predefined portion of said any edge predefined according to a predetermined manner.

13. The method of claim 10, wherein the edge-sharpness measure of said any edge is a peak gradient value of said any edge divided by a contrast across said any edge or across a predefined portion of said any edge.

14. The method of claim 10, wherein the edge-sharpness measure is a second moment of gradients in the sequence of gradients.

15. The method of claim 1, wherein the first and second measures are mutually independent in the sense that neither can be computed from the other without further involving at least one sample of image data from a predetermined neighborhood of the edge.

16. The method of claim 8, wherein the edge-sharpness measure of any edge has a unit that is a power of a unit of length, given that each sample of image data has a unit that is a unit of energy, that a difference between any pair of samples of image data divided by a distance between the samples has a unit that is a unit of energy divided by a unit of length, that a distance between gradients and a count of pixels both have a unit that is a unit of length, that a gradient value has a unit that is a unit of energy divided by a unit length, and that normalized gradient values are unitless.

17. The method of claim 1, wherein the first and second measures are both not affected by scaling the plurality of samples of image data by a non-zero scaling factor while other samples of image data are not scaled.

18. The method of claim 1, wherein the first and second measures are both affected by scaling the plurality of samples of image data by a non-zero scaling factor.

19. The method of claim 1, wherein there is a spurious sequence of gradients having perfect reflection symmetry such that the determining necessarily reduces the relative extent where the edge has the spurious sequence of gradients across itself.

20. The method of claim 19, wherein the spurious sequence of gradients is {0, 0.2, 0.2, 0.7, 0.7, 1, 0.7, 0.7, 0.2, 0.2, 0}.

* * * * *